US010160451B2

(12) United States Patent
Yamada et al.

(10) Patent No.: US 10,160,451 B2
(45) **Date of Patent: *Dec. 25, 2018**

(54) DRIVING SUPPORT DEVICE, DRIVING SUPPORT SYSTEM AND DRIVING SUPPORT METHOD

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/328,893

(22) PCT Filed: Jul. 19, 2016

(86) PCT No.: PCT/JP2016/003382
§ 371 (c)(1),
(2) Date: Jan. 24, 2017

(87) PCT Pub. No.: WO2017/022198
PCT Pub. Date: Feb. 9, 2017

(65) Prior Publication Data

US 2017/0203763 A1 Jul. 20, 2017

(30) Foreign Application Priority Data

Jul. 31, 2015 (JP) ................................ 2015-152850

(51) Int. Cl.
*B60W 30/18* (2012.01)
*B60W 50/10* (2012.01)
(Continued)

(52) U.S. Cl.
CPC ....... *B60W 30/18163* (2013.01); *B60K 35/00* (2013.01); *B60W 10/04* (2013.01);
(Continued)

(58) Field of Classification Search
CPC ................................................ B60W 30/18163
See application file for complete search history.

(56) References Cited

U.S. PATENT DOCUMENTS 9,828,020 B2 * 11/2017 Yamada .................. B62D 1/22
9,944,298 B2 * 4/2018 Yamada ............... B60W 50/10
(Continued)

FOREIGN PATENT DOCUMENTS

JP 10-105885 4/1998
JP 2005-041433 2/2005
(Continued)

OTHER PUBLICATIONS

International Search Report of PCT application No. PCT/JP2016/003382 dated Sep. 27, 2016.

*Primary Examiner* — Adam D Tissot
*Assistant Examiner* — Michael A Berns
(74) *Attorney, Agent, or Firm* — Seed IP Law Group LLP

(57) ABSTRACT

A driver can intuitively and conveniently perform an operation for instructing passing to a vehicle. In a driving support device 10, an image output unit **14*a* outputs, to a display unit 31, an image containing an own vehicle object representing an own vehicle and an another vehicle object representing another vehicle in front of the own vehicle object. An operation signal input unit 14*b*** receives an operation of a user for changing the positional relationship between the
(Continued)

own vehicle object and the another vehicle object in the image displayed on the display unit 31. A command output unit 14*c* outputs, to an automatic driving control unit 20, a command for instructing the own vehicle to pass the another vehicle when the positional relationship between the own vehicle object and the another vehicle object is changed such that the own vehicle object is positioned in front of the another vehicle object.

5 Claims, 28 Drawing Sheets

(51) Int. Cl.

| | |
|---|---|
| ***B60W 50/14*** | (2012.01) |
| ***B60W 10/04*** | (2006.01) |
| ***B60W 10/18*** | (2012.01) |
| ***B60W 10/20*** | (2006.01) |
| ***B60W 30/14*** | (2006.01) |
| ***G06F 3/0481*** | (2013.01) |
| ***G06F 3/0484*** | (2013.01) |
| ***G06F 3/0486*** | (2013.01) |
| ***G06F 3/0488*** | (2013.01) |
| ***B60K 35/00*** | (2006.01) |
| *G01S 19/13* | (2010.01) |
| *G08G 1/16* | (2006.01) |

(52) U.S. Cl.

CPC ............ *B60W 10/18* (2013.01); *B60W 10/20* (2013.01); *B60W 30/14* (2013.01); *B60W 50/10* (2013.01); *B60W 50/14* (2013.01); *G06F 3/0486* (2013.01); *G06F 3/04817* (2013.01); *G06F 3/04845* (2013.01); *G06F 3/04883* (2013.01); *B60K 2350/102* (2013.01); *B60K 2350/106* (2013.01); *B60K 2350/1012* (2013.01); *B60K 2350/1028* (2013.01); *B60K 2350/1052* (2013.01); *B60K 2350/2013* (2013.01); *B60K 2350/2047* (2013.01); *B60K 2350/2052* (2013.01); *B60W 2050/146* (2013.01); *B60W 2420/403* (2013.01); *B60W 2420/42* (2013.01); *B60W 2420/52* (2013.01); *B60W 2510/18* (2013.01); *B60W 2510/20* (2013.01); *B60W 2520/105* (2013.01); *B60W 2540/04* (2013.01); *B60W 2550/302* (2013.01); *B60W 2710/18* (2013.01); *B60W 2710/20* (2013.01); *B60W 2720/10* (2013.01); *B60W 2750/302* (2013.01); *G01S 19/13* (2013.01); *G08G 1/167* (2013.01)

(56) References Cited

U.S. PATENT DOCUMENTS

| | | | | |
|---|---|---|---|---|
| 2011/0251768 | A1* | 10/2011 | Luo | B60W 30/12 701/70 |
| 2012/0022716 | A1 | 1/2012 | Kitahama et al. | |
| 2015/0032290 | A1 | 1/2015 | Kitahama et al. | |
| 2017/0197637 | A1* | 7/2017 | Yamada | B60W 50/10 |
| 2017/0210394 | A1* | 7/2017 | Yamada | B60W 50/10 |
| 2017/0213763 | A1* | 7/2017 | Matsumoto | H01L 21/76886 |
| 2017/0225691 | A1* | 8/2017 | Yamada | B60W 50/10 |
| 2017/0225702 | A1* | 8/2017 | Yamada | B62D 1/22 |
| 2017/0364066 | A1* | 12/2017 | Yamada | G05D 1/0212 |
| 2018/0043923 | A1* | 2/2018 | Yamada | B62D 1/22 |

FOREIGN PATENT DOCUMENTS

| | | |
|---|---|---|
| JP | 2010-198578 | 9/2010 |
| JP | 2015-011458 | 1/2015 |

* cited by examiner

DRIVING SUPPORT DEVICE, DRIVING SUPPORT SYSTEM AND DRIVING SUPPORT METHOD

CROSS-REFERENCE TO RELATED APPLICATIONS

This application is a U.S. national stage application of the PCT International Application No. PCT/JP2016/003382 filed on Jul. 19, 2016, which claims the benefit of foreign priority of Japanese patent application No. 2015-152850 filed on Jul. 31, 2015, the contents all of which are incorporated herein by reference.

FIELD OF THE INVENTION

The present disclosure relates to a technique that supports a driving operation instruction of a driver to a vehicle during automatic driving.

DESCRIPTION OF THE RELATED ART

In recent years, developments in automatic driving of a car have progressed. For automatic driving, automation levels defined in 2013 by the National Highway Traffic Safety Administration (NHTSA) are classified as no automation (level 0), specific-function automation (level 1), complex-function automation (level 2), semi-automatic driving (level 3), and fully-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Automation level 4 is a fully-automatic driving system that automatically performs all of acceleration, deceleration, and steering, and thus a driver is not involved in a driving operation. Automation level 3 is a semi-fully-automatic driving system that automatically performs all of acceleration, deceleration, and steering, but if necessary, a driving operation is performed by a driver.

As a form of automatic driving, a form in which a driver does not operate an existing driving operation unit such as a steering, an accelerator pedal, or the like but instructs a specific driving operation such as traffic lane change, passing, following traveling, or the like to a vehicle by issuing a command to a vehicle is considered. In this form, a user interface in which there are fewer erroneous operations is required.

CITATION LIST

Patent Literature

PTL 1: Japanese Patent Unexamined Publication No. 10-105885

SUMMARY OF THE INVENTION

In only displaying road conditions, when a driver instructs a specific driving operation to a vehicle, the driver needs to operate each specific switch one by one, turn a steering wheel, or depress an accelerator pedal while checking the road conditions. In addition, the sight line of the driver moves, and there is a possibility of an erroneous operation. In addition, in a design in which each switch is designed for a specific driving operation such as traffic lane change, passing, following traveling, or the like, the correspondence between a switch operation and automatic traveling control is not intuitive. Further, selecting an instruction among many switches or selecting a changed function with reduced switches according to a situation is a complex task. For this reason, there is a problem in that a wide range of users including a person who has not been driving up to now, a person who wants to continue to drive even though the driving capability of the person has been reduced, or the like, cannot use an automatic driving vehicle without training.

The present disclosure has been made in consideration of such a situation, and an object thereof is to provide a technique that allows a driver to intuitively and conveniently instruct a specific driving operation to a vehicle.

In order to solve the above-described problems, a driving support device according to an aspect of the present disclosure includes an image output unit, an operation signal input unit, and a command output unit. The image output unit outputs, to a display unit, an image containing an own vehicle object representing an own vehicle and an another vehicle object representing another vehicle in front of the own vehicle object. The operation signal input unit receives an operation of a user for changing the positional relationship between the own vehicle object and the another vehicle object in the image displayed on the display unit. The command output unit outputs, to an automatic driving control unit that controls automatic driving, a command for instructing the own vehicle to pass the another vehicle when the positional relationship between the own vehicle object and the another vehicle object is changed by the operation of the user for the operation signal input unit such that the own vehicle object is positioned in front of the another vehicle object.

As another aspect of the present disclosure, an aspect in which the expression of the present disclosure is converted into a device, a system, a method, a program, a recording medium in which a program is recorded, and a vehicle equipped therewith by arbitrarily combining the above components is also effective.

According to the present disclosure, a driver can intuitively and conveniently instruct a specific driving operation to a vehicle.

DETAILED DESCRIPTION OF THE PREFERRED EMBODIMENTS

Figure 1:
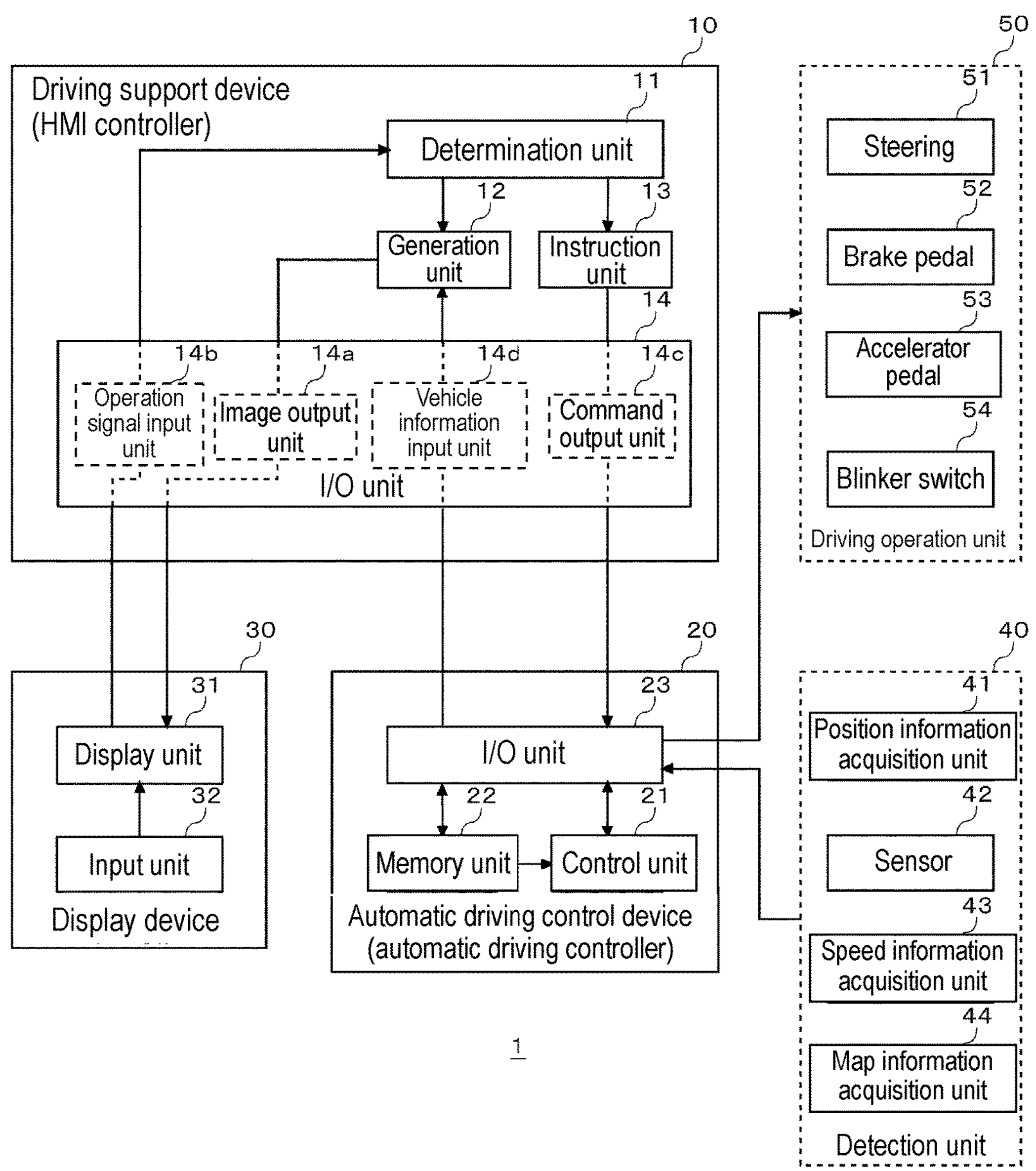
FIG. 1 is a block diagram illustrating a configuration of a vehicle according to an embodiment of the present disclosure.

Hereinafter, embodiments of the present disclosure will be described with reference to the drawings. FIG. 1 is a block diagram illustrating a configuration of vehicle 1 according to an embodiment of the present disclosure, and illustrates a configuration related to automatic driving. Vehicle 1 (an own vehicle) with an automatic driving mode includes driving support device (human machine interface (HMI)) 10, automatic driving control device (automatic driving controller) 20, display device 30, detection unit 40, and driving operation unit 50.

Display device 30 includes display unit 31 and input unit 32. Display device 30 may be a head unit such as a car navigation system, a display audio, or the like, a portable terminal device such as a smart phone, a tablet, or the like, or a dedicated console terminal device.

Display unit 31 is a liquid crystal display, an organic EL display, or a head-up display (HUD). Input unit 32 is a user interface that receives an input of a user. Display unit 31 and input unit 32 may be an integrated touch panel display. Such as a proximity touch panel that can detect proximity of a hand on a touch panel or a touch pad or a position of a finger due to a hover operation, one that receives a gesture input at a position apart from a predetermined distance from the display unit may be used. Input unit 32 may have an input device such as a mouse, a stylus pen, a trackball, or the like for assisting the gesture input. A pen that emits visible light or infrared light may also be used.

Display unit 31 and input unit 32 may be physically separated from each other, instead of being an integrated touch panel display. For example, input unit 32 includes a sensor such as a camera or the like, and may be a non-contact type input device that allows a gesture operation input in the air. For example, an operation method that starts to drag with a gesture by pointing a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as universal serial bus (USB), Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, a light detection and ranging (laser imaging detection and ranging, LIDAR), a temperature sensor, a pressure sensor, a humidity sensor, an illumination sensor, or the like is mounted. As a situation outside the vehicle, a road situation in which the own vehicle travels, an environmental situation including weather, and a traveling position or a traveling state of another vehicle that travels around the periphery of the own vehicle are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. In FIG. 1, an operation unit when these controls are performed manually is drawn. Information indicating that driving operation unit 50 is slightly moved by a driver in a manual way may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, an engine rotation speed and/or a motor rotation speed are controlled via an accelerator actuator. In a pure gas car, the engine rotation speed is controlled. In a pure electric vehicle, the motor rotation speed is controlled. In a hybrid car, both of the engine rotation speed and the motor rotation speed are controlled. The accelerator actuator can be electronically controlled by at least one of an engine ECU and a motor ECU.

Blinker switch 54 is an operation unit for blinking a blinker so as to notify a course of the vehicle to the outside. When blinker switch 54 is turned on/off by a driver, the blinker is turned on/off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller respectively transmits a state signal indicating the state of each of a steering, a brake, an engine, a motor, and a blinker lamp to automatic driving control device 20.

In the automatic driving mode, each of the steering ECU, the brake ECU, the engine ECU, and the motor ECU drives the corresponding actuator according to a control signal supplied from automatic driving control device 20. In a manual driving mode, a configuration in which an instruction is directly transferred from each of steering 51, brake pedal 52, and accelerator pedal 53 to the corresponding actuator in a mechanical way may be employed, or a configuration in which electronic control intervenes via the corresponding ECU may be employed. The blinker controller turns on/off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit 23. The configuration of control unit 21 may be realized by cooperation between hardware resources and software resources or only hardware resources. As the hardware resources, a processor, a read only memory (ROM), a random access memory (RAM), and other large scale integrated (LSI) circuits can be used, and as software resources, an operating system, an application, and a program such as a firmware or the like can be used. Memory unit 22 includes a non-volatile recording medium such as a flash memory or the like. Input-output unit 23 performs various communication controls according to various communication formats.

Control unit 21 calculates a control value for controlling an automatic control target such as a traveling direction of vehicle 1 by applying various parameter values collected from detection unit 40 and various ECUs to an automatic driving algorithm. Control unit 21 transfers the calculated control value to the ECU or controller of each control target. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, generation unit 12, instruction unit 13, and input-output unit 14. Determination unit 11, generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit (I/O unit) 14 performs various communication controls according to various communication formats. Input-output unit 14 includes image output unit **14*a*, operation signal input unit 14*b*, command output unit 14*c*, and vehicle information input unit 14*d*. Image output unit 14*a* outputs an image generated by generation unit 12 to display unit 31. Operation signal input unit 14*b* receives an operation signal that is input from input unit 32 by an operation of a driver, a passenger, or a user outside the vehicle, and outputs the operation signal to determination unit 11. Command output unit 14*c* outputs the command instructed by instruction unit 13 to automatic driving controller 20. Vehicle information input unit 14*d* receives detection data acquired by detection unit 40 or vehicle information generated by automatic driving controller 20, and outputs the detection data or the vehicle information to generation unit 12**.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
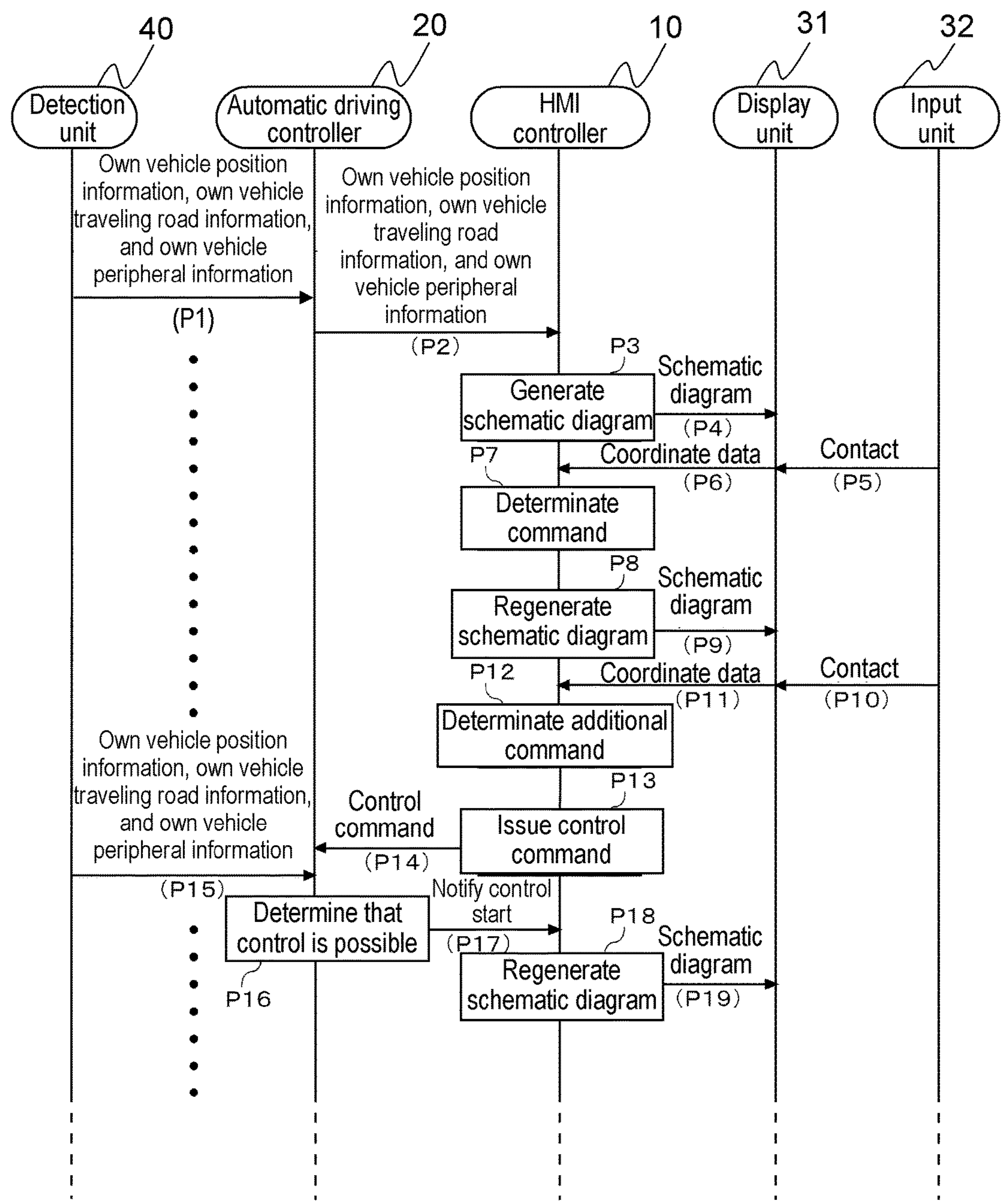
FIG. 2 is a diagram illustrating an example of a basic sequence of detection unit, automatic driving controller, HMI controller, display unit, and input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects own vehicle position information, own vehicle traveling road information, and own vehicle peripheral information including another vehicle that travels around the periphery of the own vehicle, and outputs the detected information to automatic driving controller 20 (P1). Automatic driving controller 20 outputs the own vehicle position information acquired from detection unit 40, the own vehicle traveling road information, and the own vehicle peripheral information to HMI controller 10 (P2). HMI controller 10 generates a schematic diagram including the own vehicle, another vehicle, and the own vehicle peripheral situation, based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines a type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 performs additional command processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the own vehicle position information, the own vehicle traveling road information, and the own vehicle peripheral information, and outputs the information to automatic driving controller 20 (P15). Automatic driving controller 20 determines whether or not control instructed by the command issued from HMI controller 10 is executable (P16), based on the corresponding information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a specific control value for controlling driving operation unit 50 that performs the issued command by applying various parameter values collected from detection unit 40 or various ECUs to an automatic driving algorithm, and transfers the control value to the ECU or controller of each control target, the control value being an automatic control target such as a traveling direction of vehicle 1. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that performing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
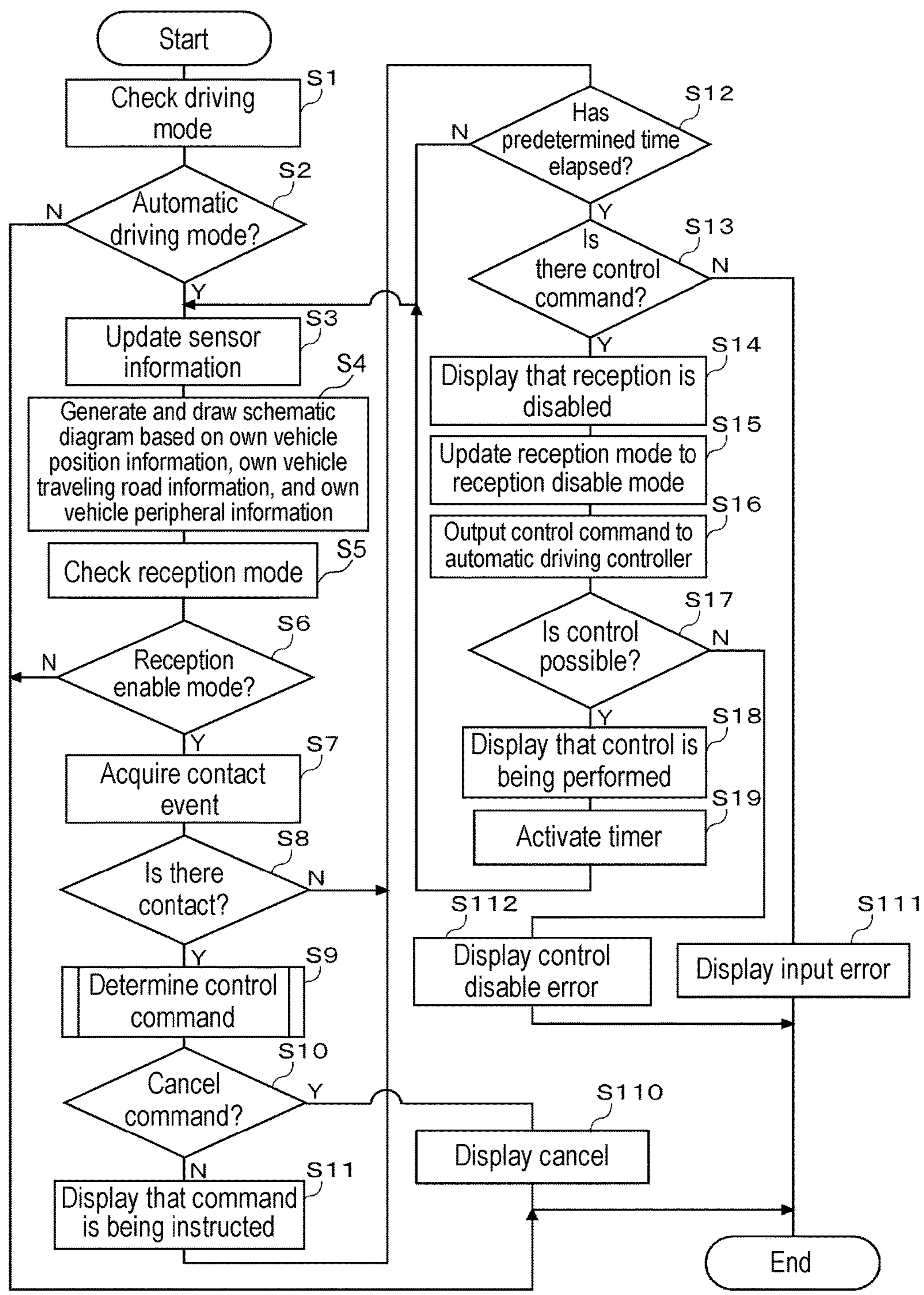
FIG. 3 is a diagram illustrating an example of a basic flowchart for explaining processing of HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Generation unit 12 of HMI controller 10 generates a schematic diagram including the own vehicle, another vehicle, and the own vehicle peripheral situation, based on the own vehicle position information, the own vehicle traveling road information, and the own vehicle peripheral information including another vehicle which travels around the periphery of the own vehicle that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), a predetermined time elapse determination processing (S12) to be described later is performed. In a case where there is a contact to input unit 32 by a user (Y in S8), determination unit 11 determines a control command according to a gesture operation input by a user (S9). The details of the determination processing will be described later.

In a case where the control command determined in step S9 is not a cancel command (N in S10), generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9, an input error is displayed (S111), and the process ends. Automatic driving controller 20 periodically detects the own vehicle position information, the own vehicle traveling road information, and the own vehicle peripheral information from detection unit 40. Since the own vehicle peripheral situation constantly changes, after the control command is output to automatic driving controller 20, there is a case where it is determined that the control command is not executable. For example, after a following instruction, there is a case where other cars interrupt between the own vehicle and another vehicle. In a case where it is determined that the control command is executable by automatic driving controller 20 (Y in S17), generation unit 12 displays that the control is being performed on display unit 31 (S18), and starts counting by activating a timer (S19). In a case where it is determined that the control is not executable by automatic driving controller 20 (N in S17), generation unit 12 displays a control disable error on display unit 31 (S112).

Figure 4:
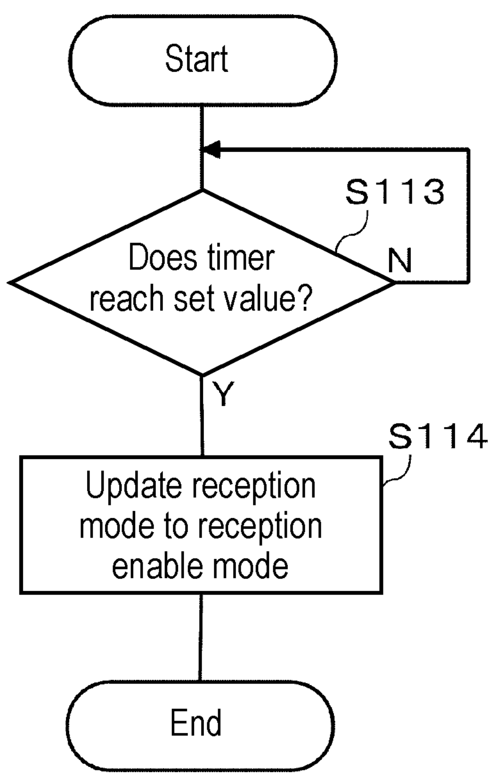
FIG. 4 is a flowchart for explaining update processing of a reception mode.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the own vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Hereinafter, in this embodiment, as a control command, an example in which a control command for instructing passing is issued will be described. A user inputs a gesture operation for instructing passing to input unit 32. A specific example of the gesture operation will be described later.

Figure 5:
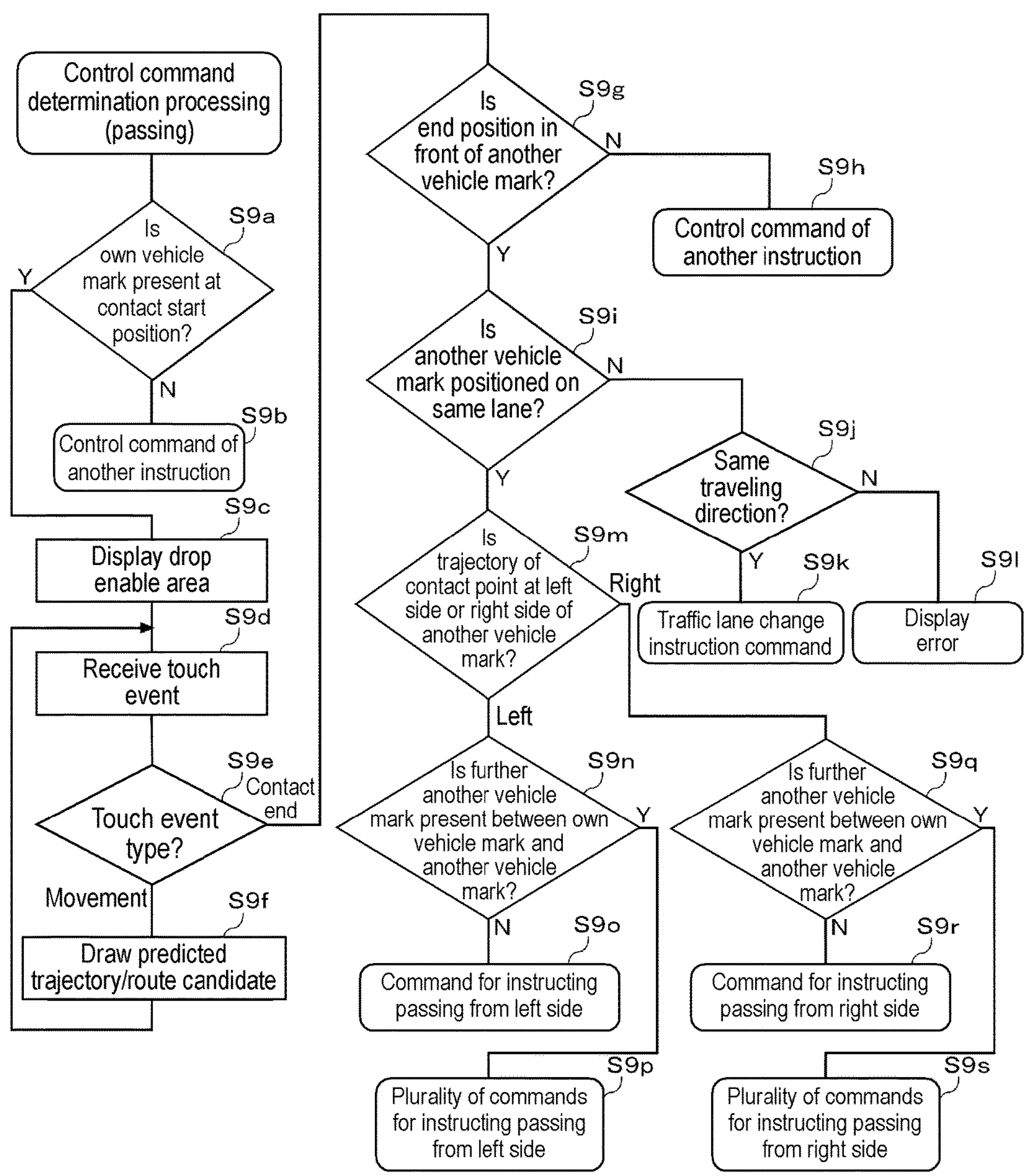
FIG. 5 is a flowchart illustrating an example of determination processing in a case where a gesture operation for instructing passing is input in step S9 of FIG. 3.

FIG. 5 is a flowchart illustrating an example of determination processing in a case where a gesture operation for instructing passing is input in step S9 of FIG. 3. Determination unit 11 of HMI controller 10 determines whether or not an own vehicle mark is present at a contact start position (S9*a*). In a case where the own vehicle mark is not present at the contact start position (N in S9*a*), determination unit 11 determines that the gesture operation is a control command of another instruction other than a passing instruction (S9*b*). In a case where the own vehicle mark is present at the contact start position (Y in S9*a*), generation unit 12 draws a drop enable area in the schematic diagram, and displays the area on display unit 31 (S9*c*). A specific example of the drop enable area will be described later.

Determination unit 11 receives a touch event generated in input unit 32 (S9*d*), and determines the type of the touch event (S9*e*). In a case where the type of the touch event is a movement (movement in S9*e*), generation unit 12 draws a prediction trajectory/route candidate of vehicle 1 in the schematic diagram, and the prediction trajectory/route candidate of vehicle 1 is displayed on display unit 31 (S9*f*).

In a case where the type of the touch event is a contact end (contact end in S9*e*), determination unit 11 determines whether or not a contact end position is in front of an another vehicle mark (S9*g*). In a case where the contact end position is not in front of an another vehicle mark (N in S9*g*), determination unit 11 determines that the gesture operation is a control command of another instruction other than a passing instruction (S9*h*). In a case where the contact end position is in front of an another vehicle mark (Y in S9*g*), determination unit 11 determines whether or not the another vehicle mark is positioned on the same lane as the lane on which the own vehicle mark is positioned (S9*i*). In a case where the another vehicle mark is not positioned on the same lane as the lane on which the own vehicle mark is positioned (N in S9*i*), determination unit 11 determines whether or not the traveling direction of the own vehicle is the same traveling direction as the traveling direction of the another vehicle (S9*j*). In a case where the traveling direction of the own vehicle is the same traveling direction as the traveling direction of the another vehicle (Y in S9*j*), determination unit 11 determines that the gesture operation is a traffic lane change instruction command for instructing the traffic lane change to the lane on which the another vehicle mark is positioned (S9*k*). In a case where the traveling direction of the own vehicle is not the same traveling direction as the traveling direction of the another vehicle (N in S9*j*), generation unit 12 displays an error message on display unit 31 (S9*l*).

In step S9*i*, in a case where the another vehicle mark is positioned on the same lane as the lane on which the own vehicle mark is positioned (Y in S9*i*), determination unit 11 determines whether or not the trajectory of the contact point passed through the left side or the right side of the another vehicle mark (S9*m*). In a case where the trajectory of the contact point passed through the left side of the another vehicle mark (left in S9*m*), determination unit 11 determines whether or not at least one further another vehicle mark is present between the own vehicle mark and the another vehicle mark (S9*n*). In a case where further another vehicle mark is not present between the own vehicle mark and the another vehicle mark (N in S9*n*), determination unit 11 determines that the gesture operation is a passing instruction command for instructing the own vehicle to pass another vehicle from the left side (S9*o*). In a case where at least one further another vehicle mark is present between the own vehicle mark and the another vehicle mark (Y in S9*n*), determination unit 11 determines that the gesture operation is a passing instruction command for instructing the own vehicle to pass a plurality of other vehicles from the left side (S9*p*).

In step S9*m*, in a case where the trajectory of the contact point passed through the right side of the another vehicle mark (right in S9*m*), determination unit 11 determines whether or not at least one further another vehicle mark is present between the own vehicle mark and the another vehicle mark (S9*q*). In a case where further another vehicle mark is not present between the own vehicle mark and the another vehicle mark (N in S9*q*), determination unit 11 determines that the gesture operation is a passing instruction command for instructing the own vehicle to pass another vehicle from the right side (S9*r*). In a case where at least one further another vehicle mark is present between the own vehicle mark and the another vehicle mark (Y in S9*q*), determination unit 11 determines that the gesture operation is a passing instruction command for instructing the own vehicle to pass a plurality of other vehicles from the right side (S9*s*).

Hereinafter, a specific example of the gesture operation that is used at the time of passing will be described. In the following examples, it is assumed that a touch panel display in which display unit 31 and input unit 32 are integrated is used.

Figure 6:
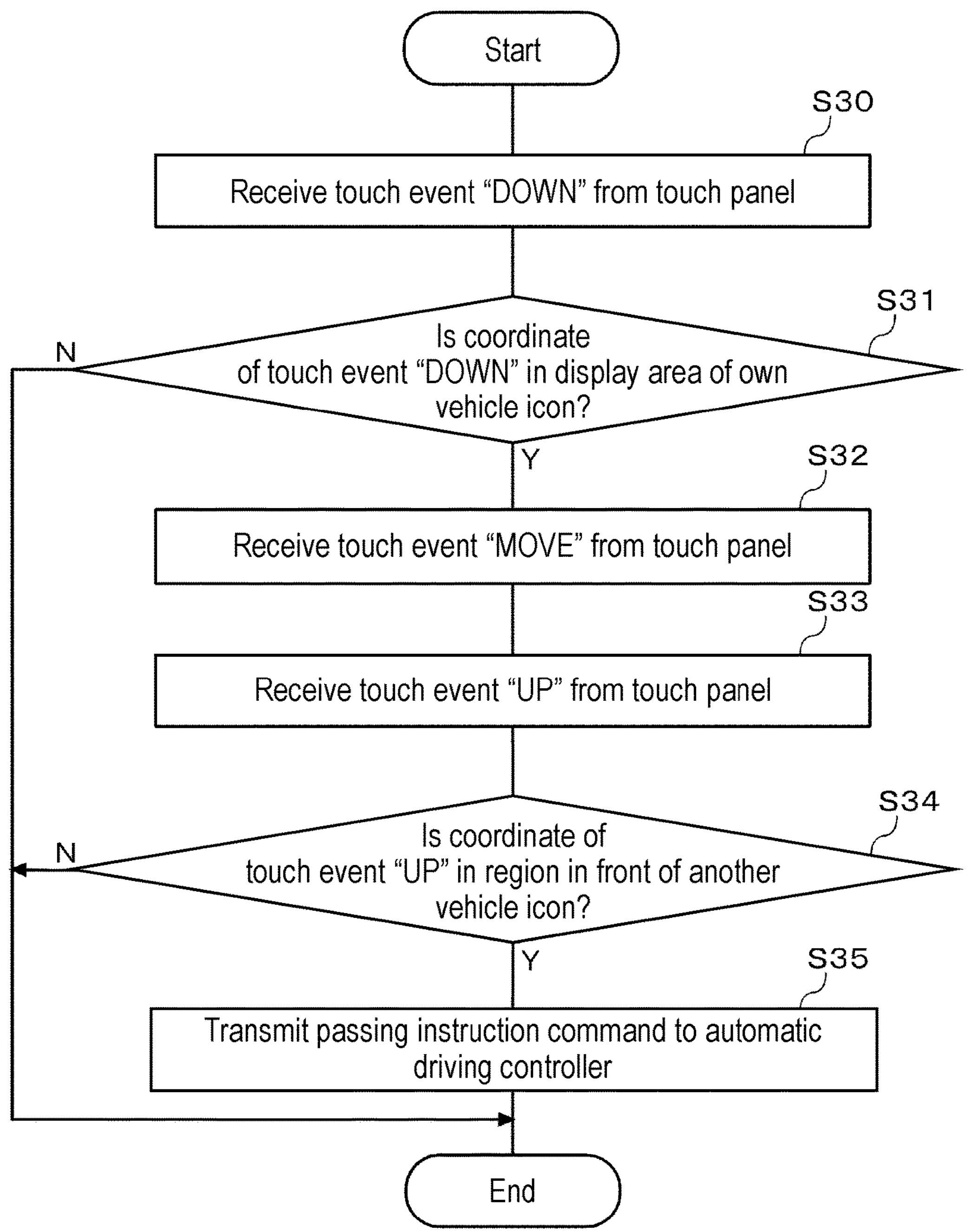
FIG. 6 is a flowchart illustrating a first processing example of issuing a passing instruction command by a gesture operation.

FIG. 6 is a flowchart illustrating a first processing example of issuing a passing instruction command by a gesture operation. Determination unit 11 of HMI controller 10 receives a touch event "DOWN" from the touch panel (S30). The touch event "DOWN" is an event representing a contact state change on the touch panel from a non-contact state to a contact state by a finger or a pen. Determination unit 11 determines whether or not a coordinate detected by the touch event "DOWN" is in a display area of an own vehicle icon (S31). In a case where the coordinate detected by the touch event "DOWN" is outside the display area of the own vehicle icon (N in S31), it is determined that the gesture operation is not a passing instruction, and the process ends.

In a case where the coordinate detected by the touch event "DOWN" is in the display area of the own vehicle icon (Y in S31), determination unit 11 receives a touch event "MOVE" from the touch panel (S32). The touch event "MOVE" is an event representing a change from a contact state on a certain point of the touch panel to a contact state on another point of the touch panel by a finger or a pen. Then, determination unit 11 receives a touch event "UP" from the touch panel (S33). The touch event "UP" is an event representing a contact state change on the touch panel from a contact state to a non-contact state by a finger or a pen.

Determination unit 11 determines whether or not a coordinate detected by the touch event "UP" is in a region in front of an another vehicle icon (S34). In a case where the coordinate detected by the touch event "UP" is in the region in front of an another vehicle icon (Y in S34), instruction unit 13 issues a passing instruction command for instructing the own vehicle to pass the another vehicle corresponding to the another vehicle icon, to automatic driving controller 20 (S35). In a case where the coordinate detected by the touch event "UP" is not in the region in front of an another vehicle icon (N in S34), it is determined that the gesture operation is not a passing instruction, and the process ends.

Figure 7:
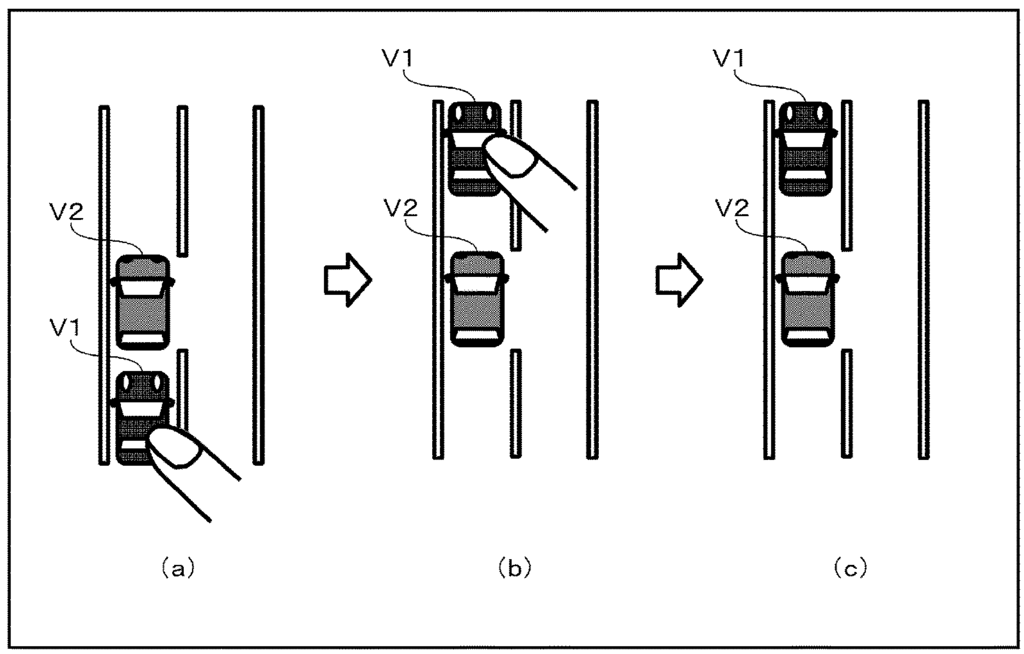
FIG. 7 is a diagram illustrating an example of a gesture operation according to the flowchart of FIG. 6.

FIG. 7 is a diagram illustrating an example of a gesture operation according to the flowchart of FIG. 6. In the schematic diagram illustrated in (a) of FIG. 7, an own vehicle icon V1 and an another vehicle icon V2 are displayed on the same lane. As display forms of an own vehicle, another vehicle, and a peripheral situation including a road, various display forms are considered. A real photographed image may be used, and a fine CG image or an animation image may be used. Display of the own vehicle is not limited to an icon, and the own vehicle may be displayed as a simpler mark or character, or may be displayed as a real photographed image. In other words, there is no problem as long as the own vehicle is displayed on a screen as an object in any display form. The same is true for the display of another vehicle.

In a case where a driver wants the own vehicle to pass another vehicle, as illustrated in (a) of FIG. 7, a driver drags the own vehicle icon V1, and as illustrated in (b) and (c) of FIG. 7, drops the own vehicle icon V1 onto the lane in front of the another vehicle icon V2. Accordingly, a passing instruction command is issued.

Figure 8:
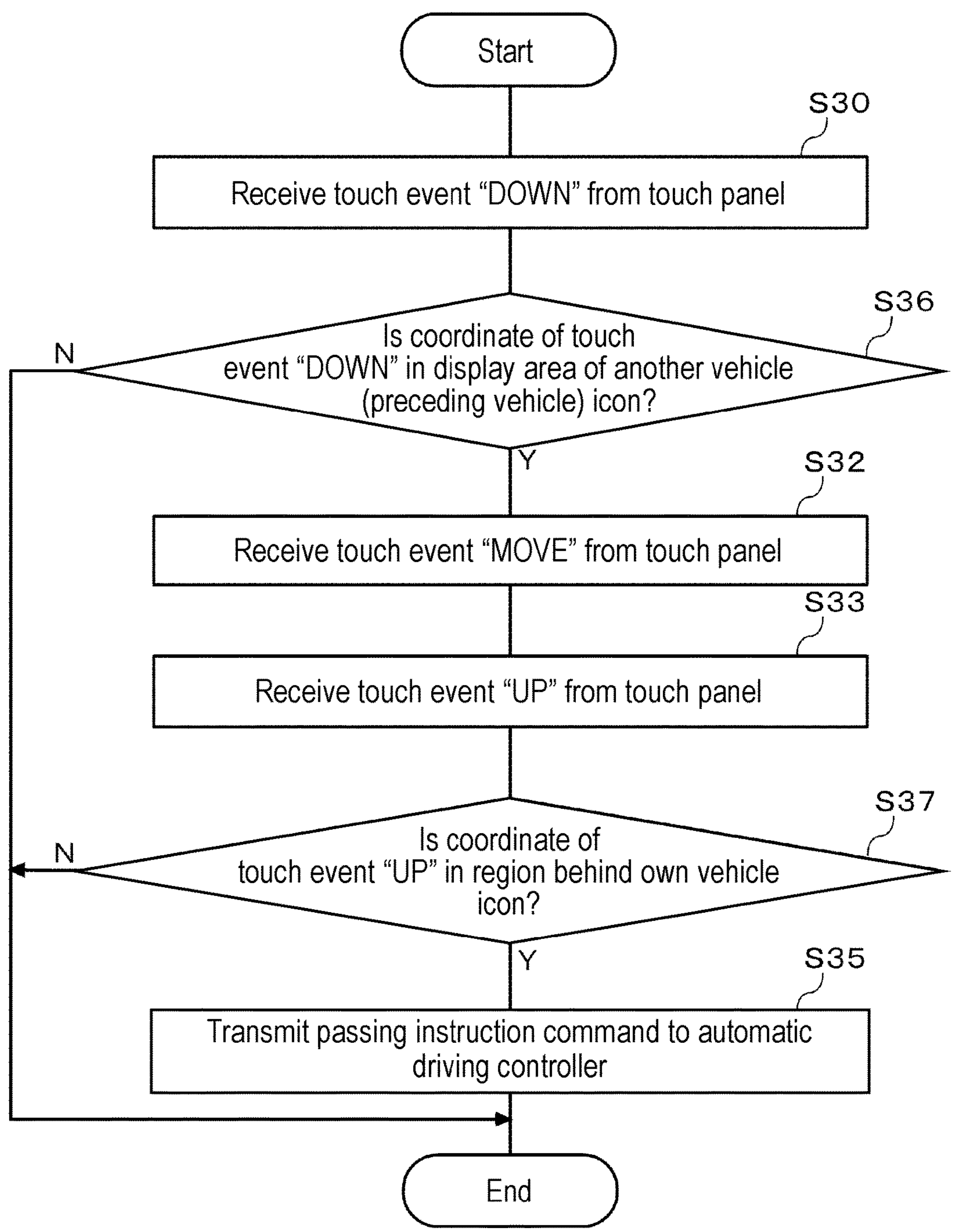
FIG. 8 is a flowchart illustrating a second processing example of issuing a passing instruction command by a gesture operation.

FIG. 8 is a flowchart illustrating a second processing example of issuing a passing instruction command by a gesture operation. The second processing example is an example in which an another vehicle icon is dragged and dropped. Determination unit 11 of HMI controller 10 receives a touch event "DOWN" from the touch panel (S30). Determination unit 11 determines whether or not a coordinate detected by the touch event "DOWN" is in a display area of an another vehicle (preceding vehicle) icon (S36). In a case where the coordinate detected by the touch event "DOWN" is outside the display area of an another vehicle (preceding vehicle) icon (N in S36), it is determined that the gesture operation is not a passing instruction, and the process ends.

In a case where the coordinate detected by the touch event "DOWN" is in the display area of an another vehicle (preceding vehicle) icon (Y in S36), determination unit 11 receives a touch event "MOVE" from the touch panel (S32). Then, determination unit 11 receives a touch event "UP" from the touch panel (S33). Determination unit 11 determines whether or not a coordinate detected by the touch event "UP" is in a region behind the own vehicle icon (S37). In a case where the coordinate detected by the touch event "UP" is in the region behind the own vehicle icon (Y in S37), instruction unit 13 issues a passing instruction command for instructing the own vehicle to pass the another vehicle corresponding to the another vehicle (preceding vehicle) icon, to automatic driving controller 20 (S35). In a case where the coordinate detected by the touch event "UP" is not in the region behind the own vehicle icon (N in S37), it is determined that the gesture operation is not a passing instruction, and the process ends.

Figure 9:
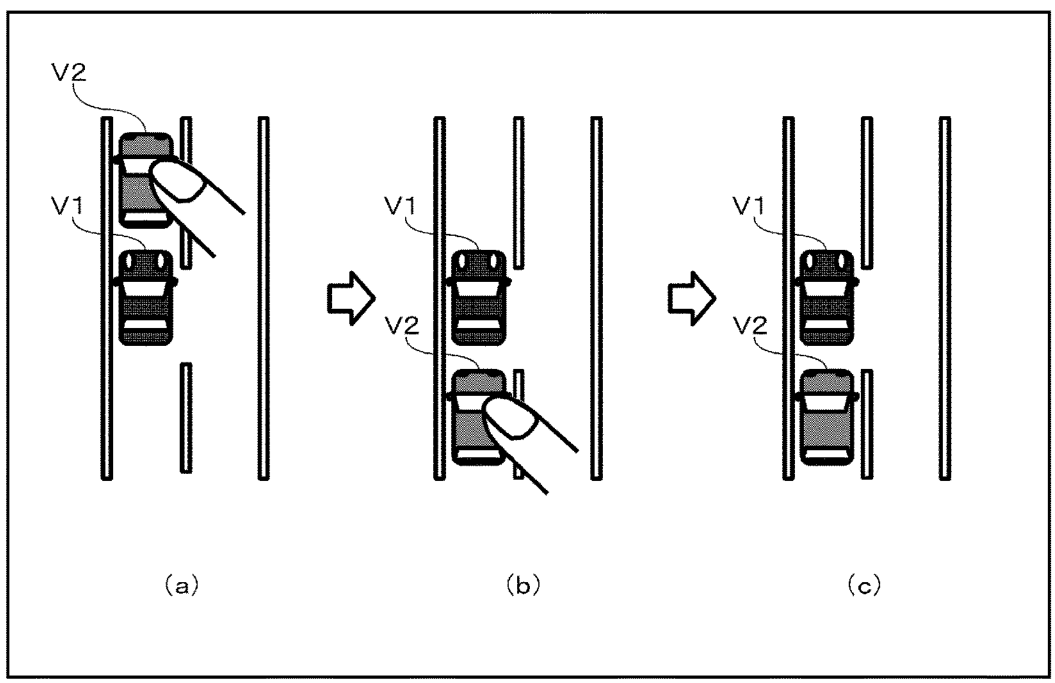
FIG. 9 is a diagram illustrating an example of a gesture operation according to the flowchart of FIG. 8.

FIG. 9 is a diagram illustrating an example of a gesture operation according to the flowchart of FIG. 8. In a case where a driver wants the own vehicle to pass another vehicle, as illustrated in (a) of FIG. 9, a driver drags the another vehicle icon V2, and as illustrated in (b) and (c) of FIG. 9, drops the another vehicle icon V2 onto the lane behind the own vehicle icon V1. Accordingly, a passing instruction command is issued.

Figure 10:
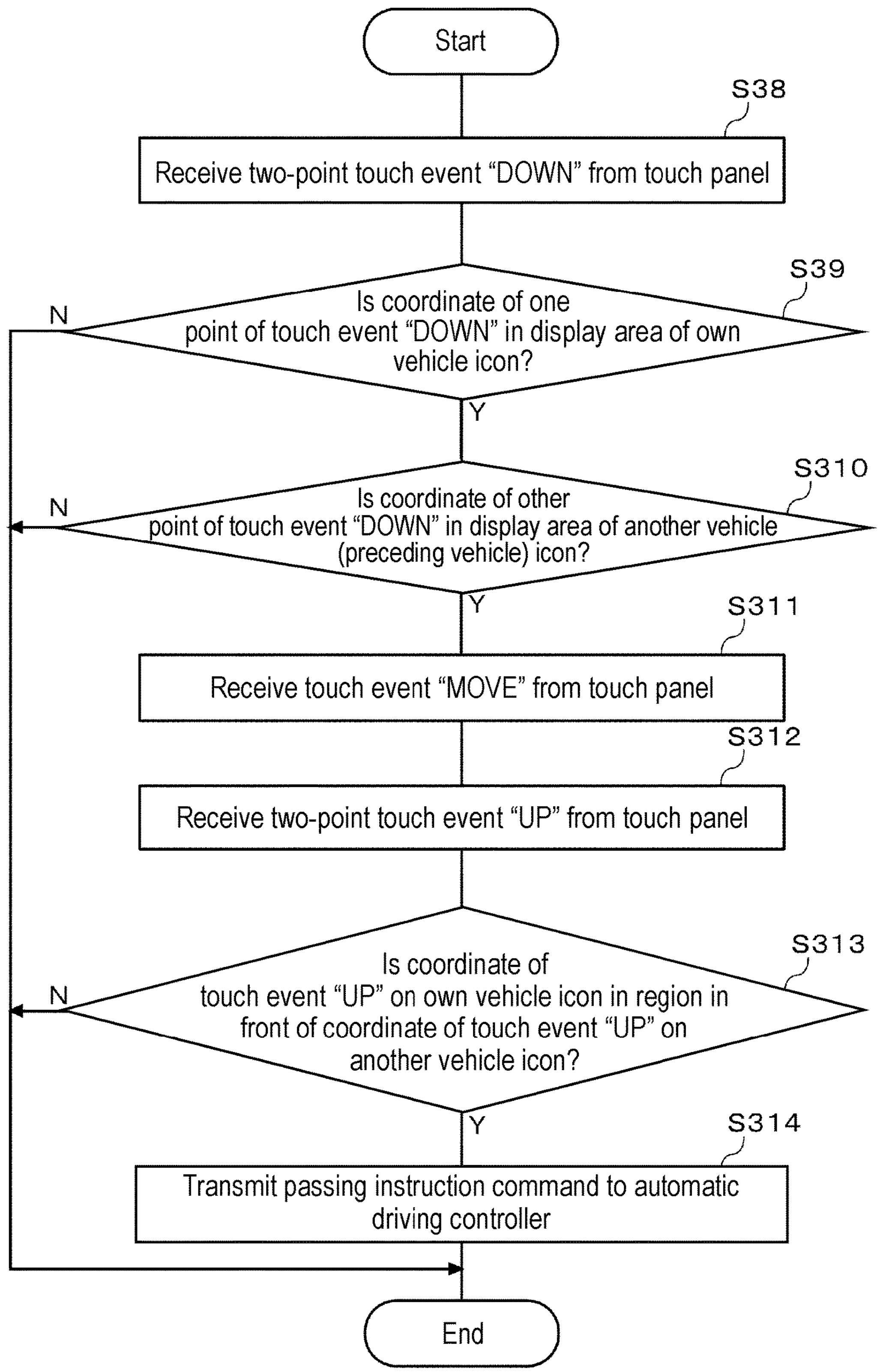
FIG. 10 is a flowchart illustrating a third processing example of issuing a passing instruction command by a gesture operation.

FIG. 10 is a flowchart illustrating a third processing example of issuing a passing instruction command by a gesture operation. The third processing example is an example in which an own vehicle icon and an another vehicle icon are interchanged (rotated by a gesture). Determination unit 11 of HMI controller 10 receives a two-point touch event "DOWN" from the touch panel (S38). Determination unit 11 determines whether or not a coordinate of one point detected by the touch event "DOWN" is in a display area of the own vehicle icon (S39). In a case where the coordinate of one point detected by the touch event "DOWN" is outside the display area of the own vehicle icon (N in S39), it is determined that the gesture operation is not a passing instruction, and the process ends.

In a case where the coordinate of one point detected by the touch event "DOWN" is in the display area of the own vehicle icon (Y in S39), determination unit 11 determines whether or not a coordinate of the other point detected by the touch event "DOWN" is in a display area of the another vehicle (preceding vehicle) icon (S310). In a case where the coordinate of the other point detected by the touch event "DOWN" is outside the display area of the another vehicle (preceding vehicle) icon (N in S310), it is determined that the gesture operation is not a passing instruction, and the process ends.

In a case where the coordinate of the other point detected by the touch event "DOWN" is in the display area of the another vehicle (preceding vehicle) icon (Y in S310), determination unit 11 receives a touch event "MOVE" from the touch panel (S311). Then, determination unit 11 receives a two-point touch event "UP" from the touch panel (S312). Determination unit 11 determines whether or not a coordinate detected by the touch event "UP" on the own vehicle icon is in a region in front of a coordinate detected by the touch event "UP" on the another vehicle icon (S313). In a case where the own vehicle icon is in front of the another vehicle icon (Y in S313), instruction unit 13 issues a passing instruction command for instructing the own vehicle to pass the another vehicle corresponding to the another vehicle (preceding vehicle) icon, to automatic driving controller 20 (S314). In a case where the own vehicle icon is not in front of the another vehicle icon (N in S313), it is determined that the gesture operation is not a passing instruction, and the process ends.

Figure 11:
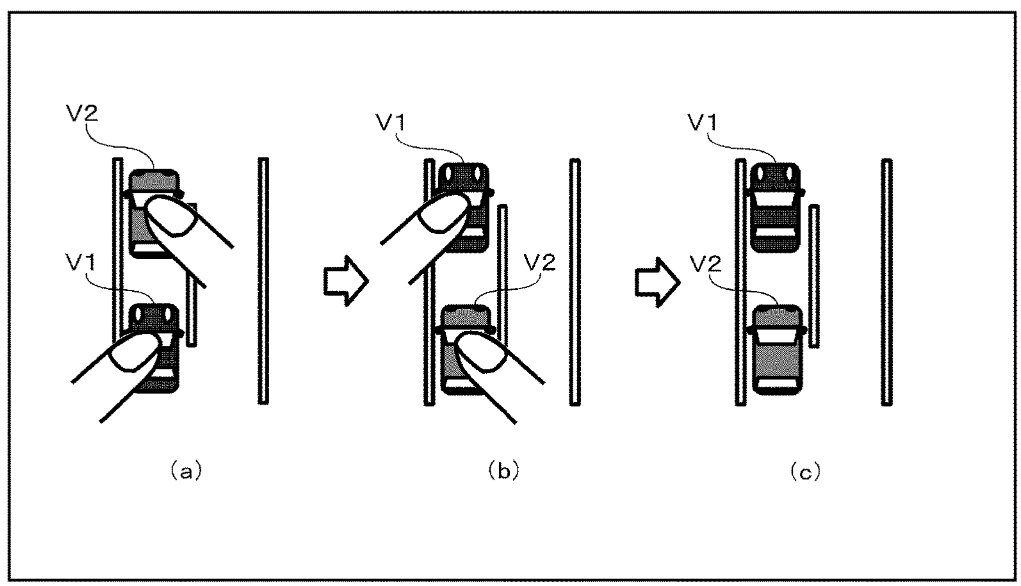
FIG. 11 is a diagram illustrating an example of a gesture operation according to the flowchart of FIG. 10.

FIG. 11 is a diagram illustrating an example of a gesture operation according to the flowchart of FIG. 10. In a case where a driver wants the own vehicle to pass another vehicle, as illustrated in (a) of FIG. 11, a driver touches the own vehicle icon V1 and the another vehicle icon V2 with two fingers, and as illustrated in (b) and (c) of FIG. 11, interchanges the order of the own vehicle icon V1 and the another vehicle icon V2, and drops the own vehicle icon V1 and the another vehicle icon V2. Accordingly, a passing instruction command is issued.

Figure 12:
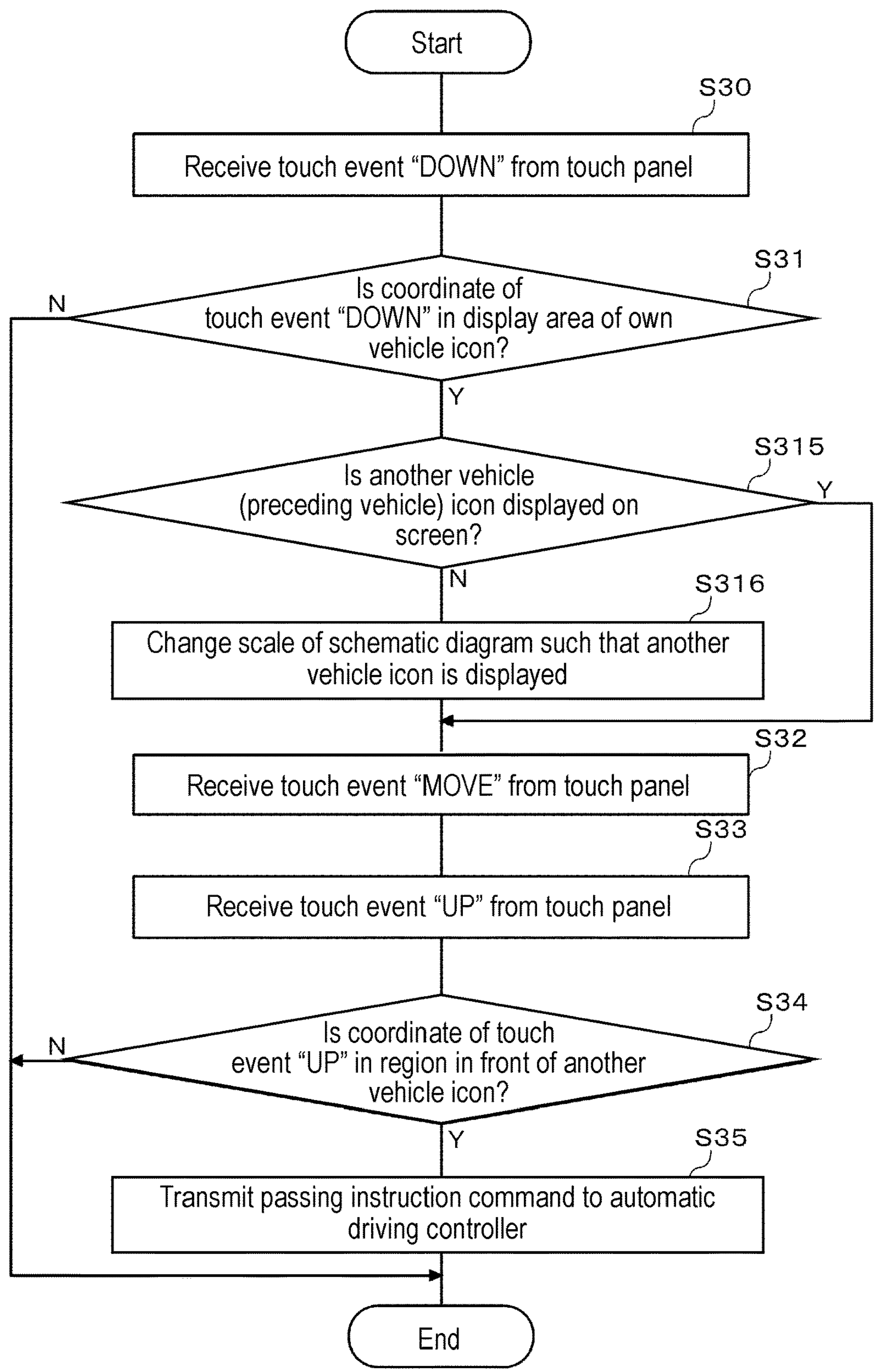
FIG. 12 is a flowchart illustrating a fourth processing example of issuing a passing instruction command by a gesture operation.

FIG. 12 is a flowchart illustrating a fourth processing example of issuing a passing instruction command by a gesture operation. The fourth processing example is an example in which an own vehicle icon is touched and then the scale of the schematic diagram is changed. Determination unit 11 of HMI controller 10 receives a touch event "DOWN" from the touch panel (S30). Determination unit 11 determines whether or not a coordinate detected by the touch event "DOWN" is in a display area of the own vehicle icon (S31). In a case where the coordinate detected by the touch event "DOWN" is outside the display area of the own vehicle icon (N in S31), it is determined that the gesture operation is not a passing instruction, and the process ends.

In a case where the coordinate detected by the touch event "DOWN" is in the display area of the own vehicle icon (Y in S31), determination unit 11 determines whether or not an another vehicle (preceding vehicle) icon is included in the schematic diagram of the screen displayed on the touch panel (S315). In a case where an another vehicle (preceding vehicle) icon is not included in the schematic diagram of the screen (N in S315), generation unit 12 changes (reduces) the scale of the schematic diagram such that an another vehicle (preceding vehicle) icon is included in the schematic diagram (S316). In a case where an another vehicle (preceding vehicle) icon is included in the schematic diagram of the screen (Y in S315), the process of step S316 is skipped. Determination unit 11 receives a touch event "MOVE" from the touch panel (S32). Processes from step S33 to step S35 of FIG. 12 are the same as those of the flowchart of FIG. 6.

Figure 13:
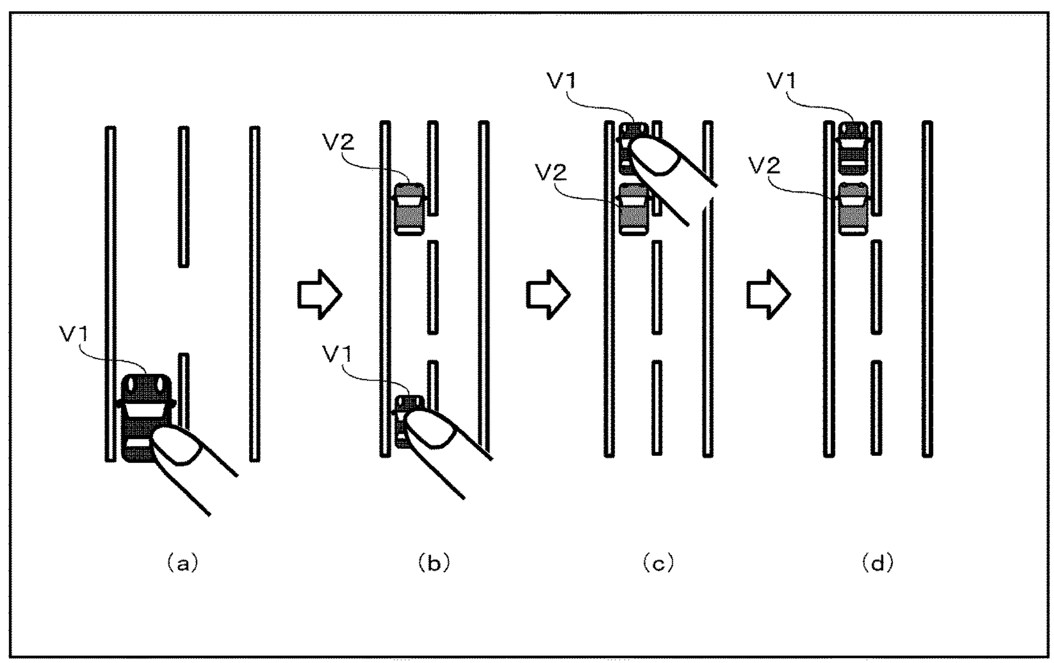
FIG. 13 is a diagram illustrating an example of a gesture operation according to the flowchart of FIG. 12.

FIG. 13 is a diagram illustrating an example of a gesture operation according to the flowchart of FIG. 12. As illustrated in (a) of FIG. 13, when a driver touches an own vehicle icon V1, in a case where an another vehicle icon is not present in the schematic diagram displayed on the screen, as illustrated in (b) of FIG. 13, the driver reduces the scale of the schematic diagram until an another vehicle icon V2 is included in the schematic diagram. As illustrated in (c) and (d) of FIG. 13, a driver drops the own vehicle icon V1 onto a position in front of the another vehicle icon V2 that is shown to be displayed. Accordingly, a passing instruction command is issued. Accordingly, it is possible to easily find another vehicle, and more quickly issue a passing instruction command.

Figure 14:
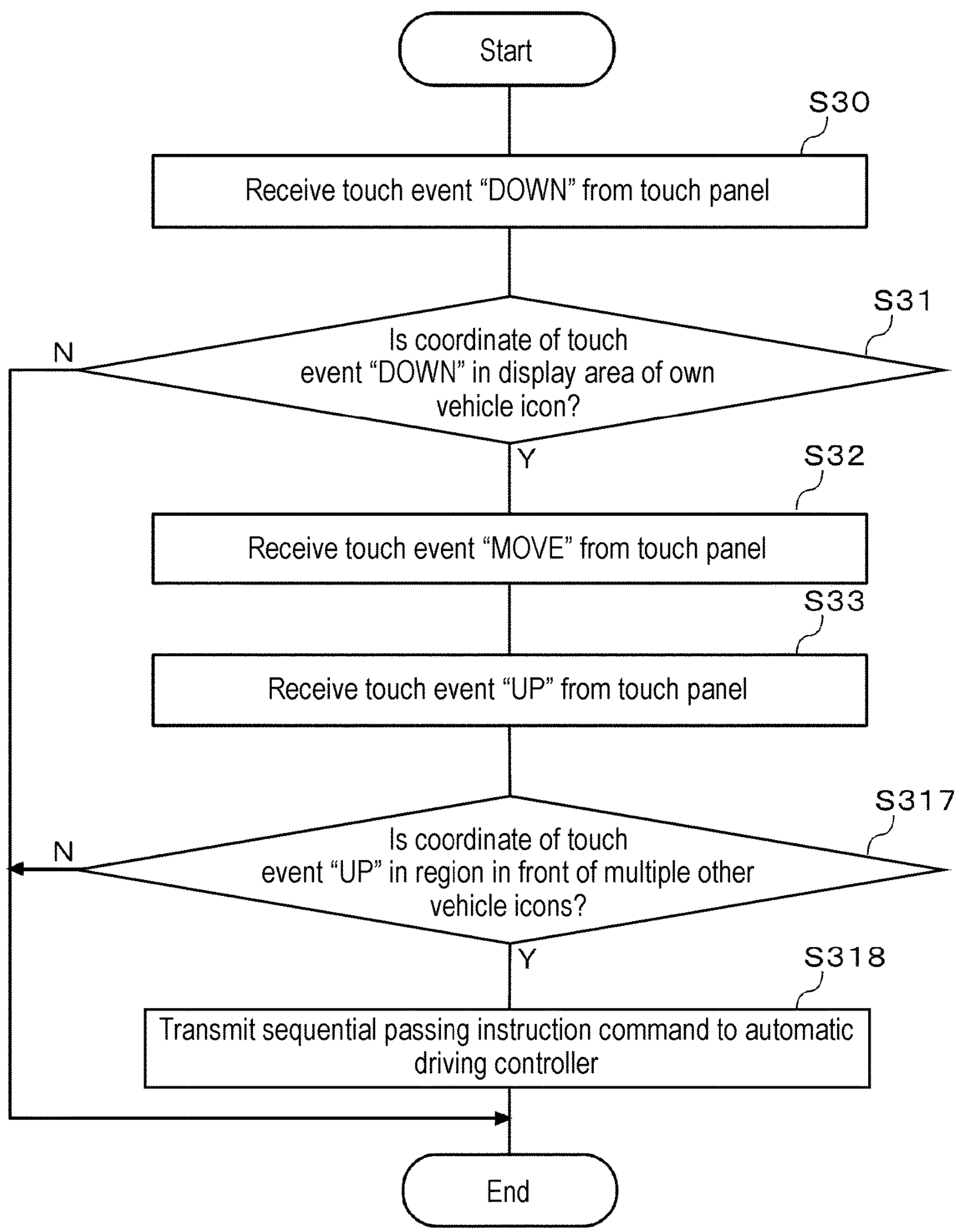
FIG. 14 is a flowchart illustrating a fifth processing example of issuing a passing instruction command by a gesture operation.

FIG. 14 is a flowchart illustrating a fifth processing example of issuing a passing instruction command by a gesture operation. The fifth processing example is an example in which an own vehicle passes a plurality of other vehicles. Processes from step S30 to step S33 are the same as those of the flowchart of FIG. 6.

Determination unit 11 determines whether or not the coordinate detected by the touch event "UP" is in a region in front of a plurality of other vehicle icons (S317). In a case where the coordinate detected by the touch event "UP" is in the region in front of the plurality of other vehicle icons (Y in S317), instruction unit 13 issues a sequential passing instruction command for instructing the own vehicle to sequentially pass a plurality of other vehicles corresponding to the plurality of other vehicle icons, to automatic driving controller 20 (S318). In a case where the coordinate detected by the touch event "UP" is not in the region in front of the plurality of other vehicle icons (N in S317), it is determined that the gesture operation is not a sequential passing instruction command, and the process ends.

Figure 15:
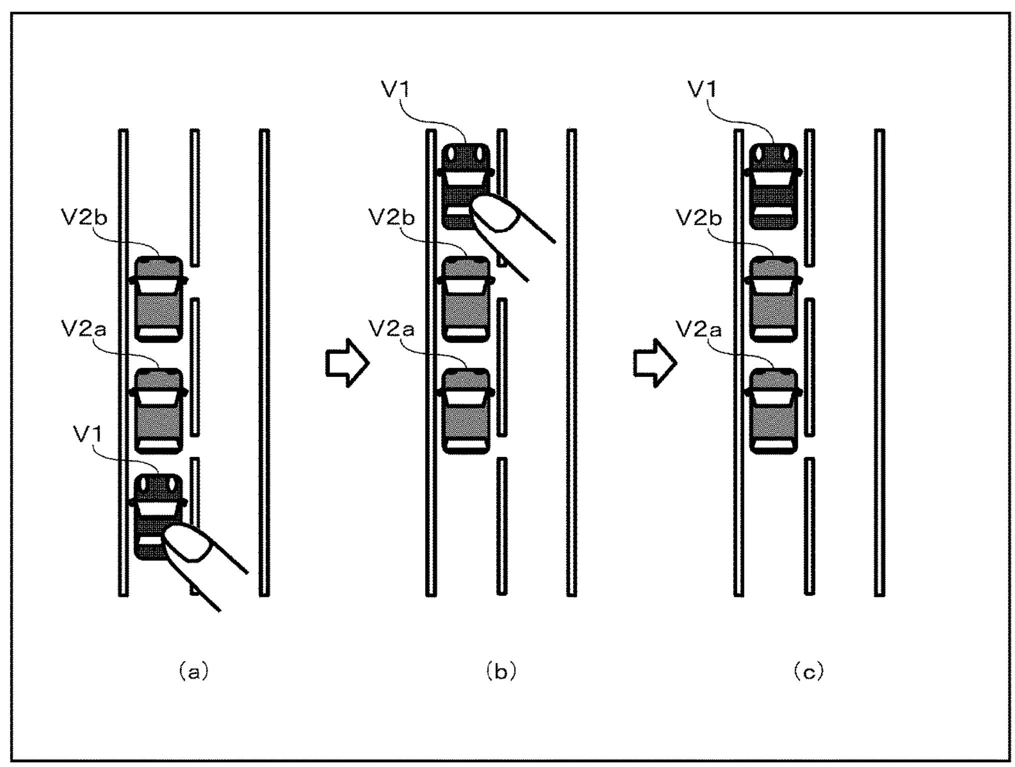
FIG. 15 is a diagram illustrating an example of a gesture operation according to the flowchart of FIG. 14.

FIG. 15 is a diagram illustrating an example of a gesture operation according to the flowchart of FIG. 14. In a case where a driver wants the own vehicle to pass two preceding other vehicles at a time, as illustrated in (a) of FIG. 15, the driver drags an own vehicle icon V1, and as illustrated in (b) and (c) of FIG. 15, drops the own vehicle icon V1 onto a position in front of two other vehicle icons V2*a* and V2*b*. Accordingly, a sequential passing instruction command is issued.

Figure 16:
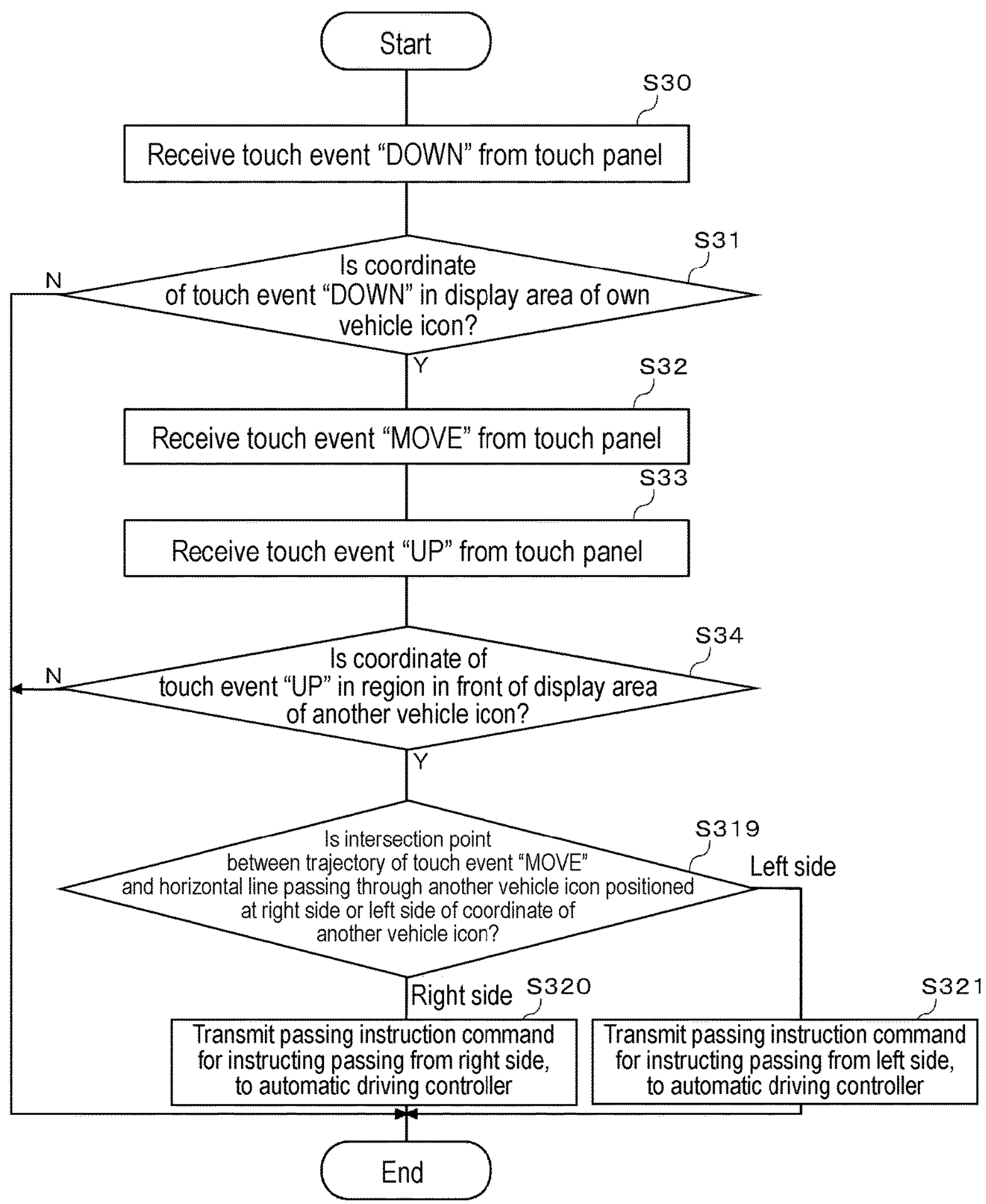
FIG. 16 is a flowchart illustrating a sixth processing example of issuing a passing instruction command by a gesture operation.

FIG. 16 is a flowchart illustrating a sixth processing example of issuing a passing instruction command by a gesture operation. The sixth processing example is an example in which a passing course is designated at the time of passing another vehicle. Processes from step S30 to step S34 are the same as those of the flowchart of FIG. 6.

Determination unit 11 determines whether an intersection point between the trajectory of the touch event "MOVE" and a horizontal line passing through the another vehicle icon is positioned at the right side or the left side of the coordinate of the another vehicle icon (S319). In a case where the intersection point is positioned at the right side of the coordinate of the another vehicle icon (right in S319), instruction unit 13 issues a passing instruction command for instructing the own vehicle to pass the another vehicle corresponding to the another vehicle icon from the right side, to automatic driving controller 20 (S320). In a case where the intersection point is positioned at the left side of the coordinate of the another vehicle icon (left in S319), instruction unit 13 issues a passing instruction command for instructing the own vehicle to pass the another vehicle corresponding to the another vehicle icon from the left side, to automatic driving controller 20 (S321).

Figure 17:
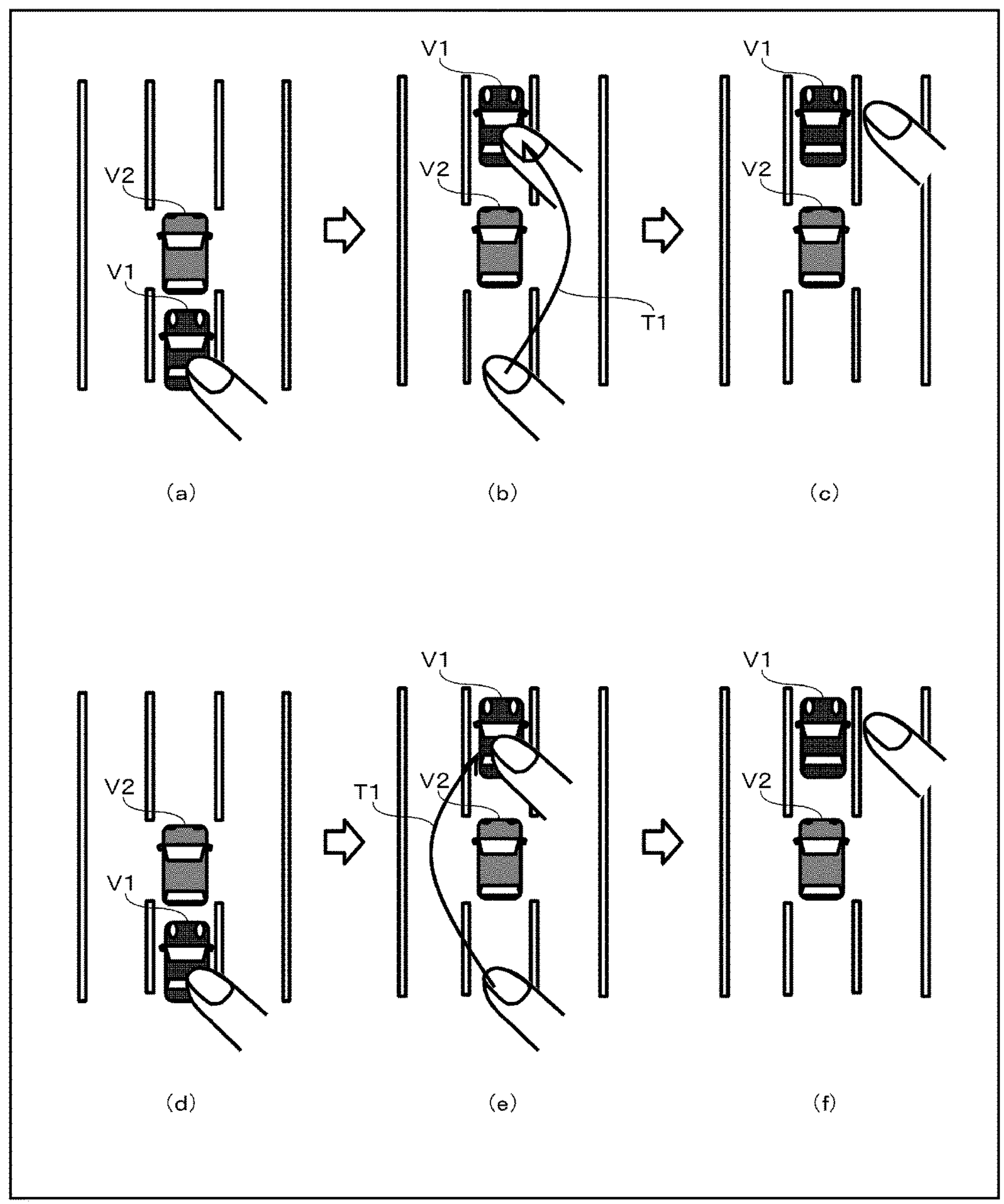
FIG. 17 is a diagram illustrating an example of a gesture operation according to the flowchart of FIG. 16.

FIG. 17 is a diagram illustrating an example of a gesture operation according to the flowchart of FIG. 16. When a driver wants the own vehicle to pass a preceding vehicle from the right side, as illustrated in (a) of FIG. 17, the driver drags an own vehicle icon V1, as illustrated in (b) of FIG. 17, moves the own vehicle icon V1 so as to turn around the right side of the another vehicle icon V2, and as illustrated in (c) of FIG. 17, drops the own vehicle icon V1 onto a position in front of the another vehicle icon V2. Accordingly, a passing instruction command for instructing passing from the right side is issued.

On the other hand, when a driver wants the own vehicle to pass a preceding vehicle from the left side, as illustrated in (d) of FIG. 17, the driver drags an own vehicle icon V1, as illustrated in (e) of FIG. 17, moves the own vehicle icon V1 so as to turn around the left side of the another vehicle icon V2, and as illustrated in (f) of FIG. 17, drops the own vehicle icon V1 onto a position in front of the another vehicle icon V2. Accordingly, a passing instruction command for instructing passing from the left side is issued.

Instead of the instruction of a user for a specific control method related to passing, for example, a user only instructs passing by moving an own vehicle mark to a position in front of a preceding vehicle (another vehicle) mark, and a specific control method related to a command may be changed according to the context by a vehicle. For example, generally, in the Japanese traffic rules, although it is allowed to pass another vehicle from a right-side traffic lane, in a case where there is no other vehicle traveling on a left-side traffic lane, the own vehicle may pass another vehicle from a left-side traffic lane. In addition, passing may be performed on a route that matches a taste of a driver with reference to personal preference data. In the specific control method related to a command, for example, determination unit 11 of HMI controller 10 may determine the specific control method in consideration of a course, an execution timing, a speed, and the like, and transmit a command including the specific control method to automatic driving controller 20, or automatic driving controller 20 may determine the specific control method after the command is received. Further, the specific control method may be selected by a driver by displaying a selection of the specific control method that is determined by HMI controller 10 or automatic driving controller 20 on display unit 31, or by visually/tactually notifying a driver of the specific control method using a notification unit including a speaker or vibration means that is not illustrated.

Figure 18:
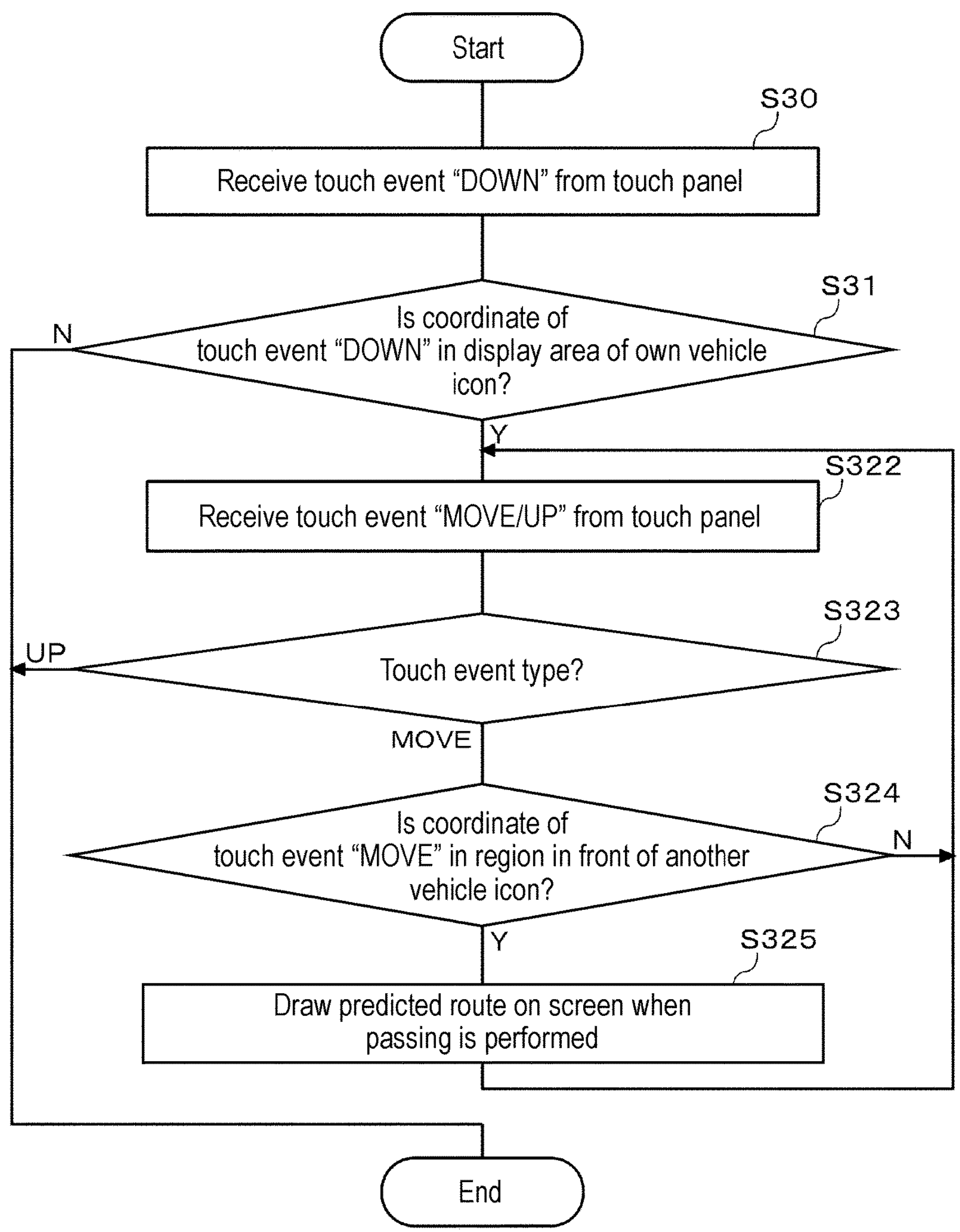
FIG. 18 is a flowchart illustrating a seventh processing example of issuing a traffic lane change instruction command by a gesture operation.

FIG. 18 is a flowchart illustrating a seventh processing example of issuing a traffic lane change instruction command by a gesture operation. The seventh processing example is an example of displaying a trajectory of the own vehicle icon in the schematic diagram. Determination unit 11 of HMI controller 10 receives a touch event "DOWN" from the touch panel (S30). Determination unit 11 determines whether or not a coordinate detected by the touch event "DOWN" is in a display area of the own vehicle icon (S31). In a case where the coordinate detected by the touch event "DOWN" is outside the display area of the own vehicle icon (N in S31), it is determined that the gesture operation is not a passing instruction, and the process ends.

In a case where the coordinate detected by the touch event "DOWN" is in the display area of the own vehicle icon (Y in S31), determination unit 11 receives a touch event "MOVE"/"UP" from the touch panel (S322). Determination unit 11 determines the type of the touch event (S323). In a case where the type of the touch event is "MOVE" (MOVE in S323), determination unit 11 determines whether or not a coordinate detected by the touch event "MOVE" is in a region in front of an another vehicle (preceding vehicle) icon (S324). In a case where the coordinate detected by the touch event "MOVE" is in the region in front of an another vehicle (preceding vehicle) icon (Y in S324), generation unit 12 generates a predicted route of the own vehicle when passing is performed, and displays the predicted route of the own vehicle on the touch panel (S325). In a case where the coordinate detected by the touch event "MOVE" is not in the region in front of an another vehicle (preceding vehicle) icon (N in S324), the process of step S325 is skipped. Next, the process transitions to step S322. Since the present flowchart is focused on the display of the predicted route, in step S323, subsequent processing in a case where the type of the touch event is "UP" (UP in S323) is omitted.

Figure 19:
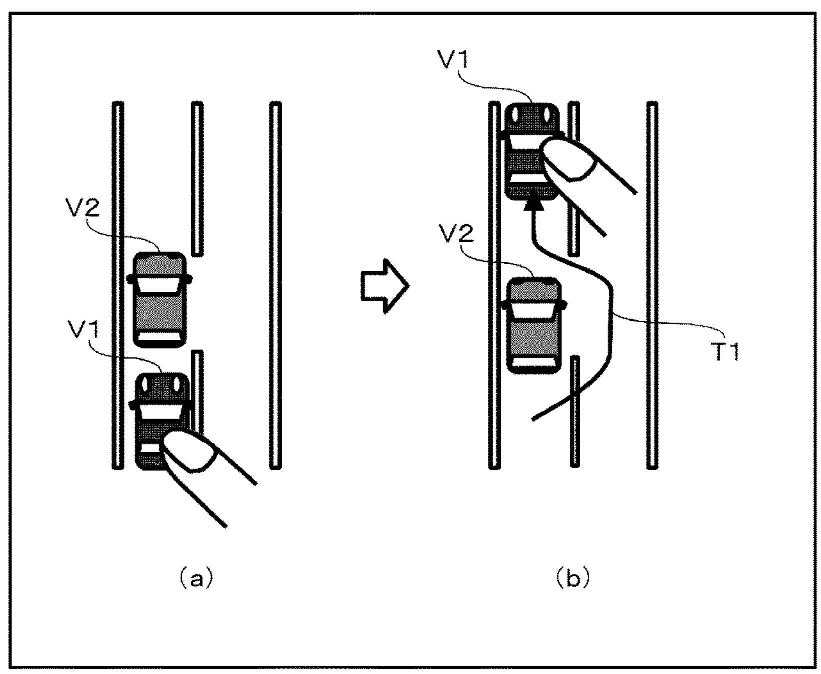
FIG. 19 is a diagram illustrating an example of a gesture operation according to the flowchart of FIG. 18.

FIG. 19 is a diagram illustrating an example of a gesture operation according to the flowchart of FIG. 18. In a case where a driver wants the own vehicle to pass another vehicle, as illustrated in (a) of FIG. 19, when the driver drops the own vehicle icon V1, and as illustrated in (b) of FIG. 19, drags the own vehicle icon V1 onto a position in front of the another vehicle icon V2, a predicted route T1 through which the own vehicle passes at the time of passing another vehicle is displayed.

Figure 20:
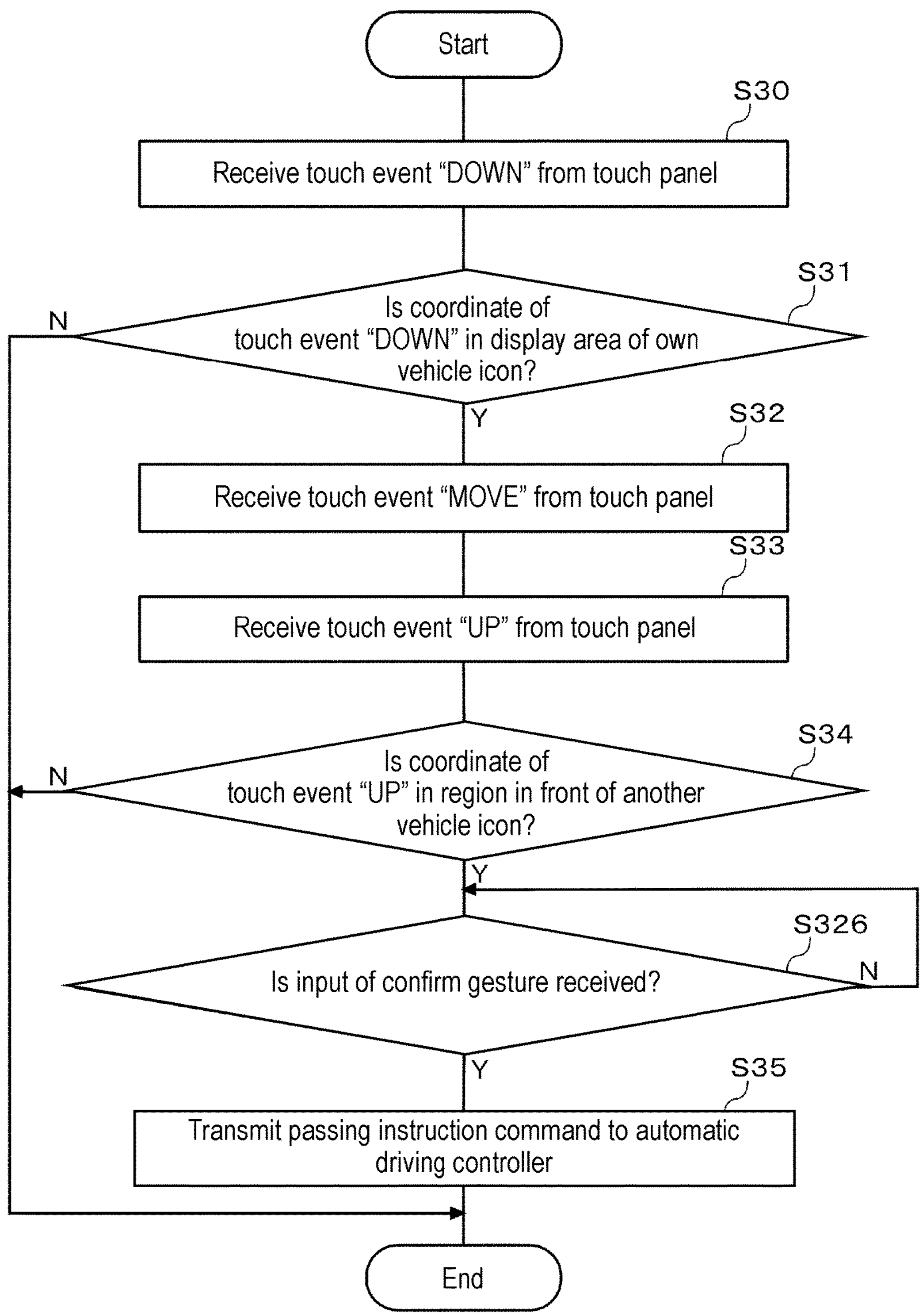
FIG. 20 is a flowchart illustrating an eighth processing example of issuing a passing instruction command by a gesture operation.

FIG. 20 is a flowchart illustrating an eighth processing example of issuing a passing instruction command by a gesture operation. The eighth processing example is an example of requesting a confirm operation. Processes from step S30 to step S34 are the same as those of the flowchart of FIG. 6.

In a case where the coordinate detected by the touch event "UP" is in the region in front of an another vehicle (preceding vehicle) icon (Y in S34), when determination unit 11 receives an input of a confirm gesture (Y in S326), instruction unit 13 issues a passing instruction command for instructing the own vehicle to pass the another vehicle corresponding to the another vehicle icon, to automatic driving controller 20 (S35). During a period for which a confirm gesture is not input (N in S326), the issue of the command is suspended. Accordingly, further, it is possible to prevent erroneous operations.

Figure 21:
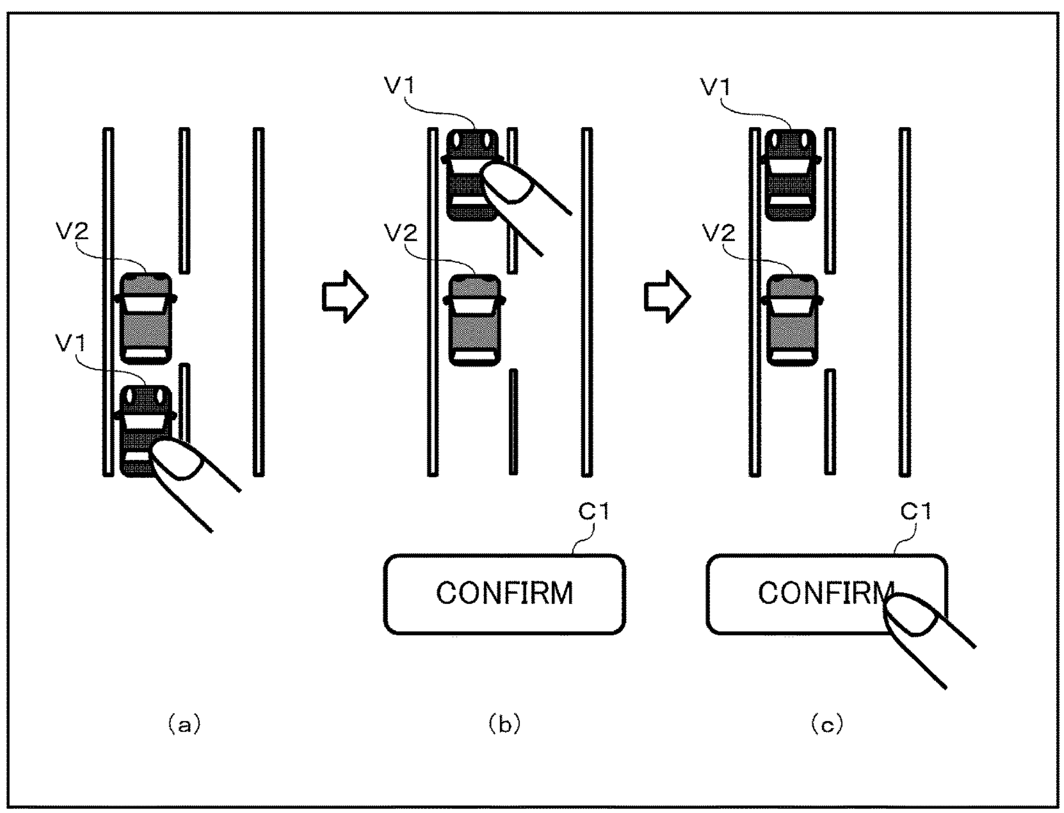
FIG. 21 is a diagram illustrating an example of a gesture operation according to the flowchart of FIG. 20.

FIG. 21 is a diagram illustrating an example of a gesture operation according to the flowchart of FIG. 20. In a case where a driver wants the own vehicle to pass a preceding vehicle, as illustrated in (a) of FIG. 21, the driver drags the own vehicle icon V1, and as illustrated in (b) of FIG. 21, moves the own vehicle icon V1 to a position in front of the another vehicle icon V2. When the own vehicle icon V1 is moved, a confirm button C1 is displayed. As illustrated in (c) of FIG. 21, after the own vehicle icon V1 is dropped onto the position in front of the another vehicle icon V2, when the confirm button C1 is pressed, a passing instruction command is issued.

Figure 22:
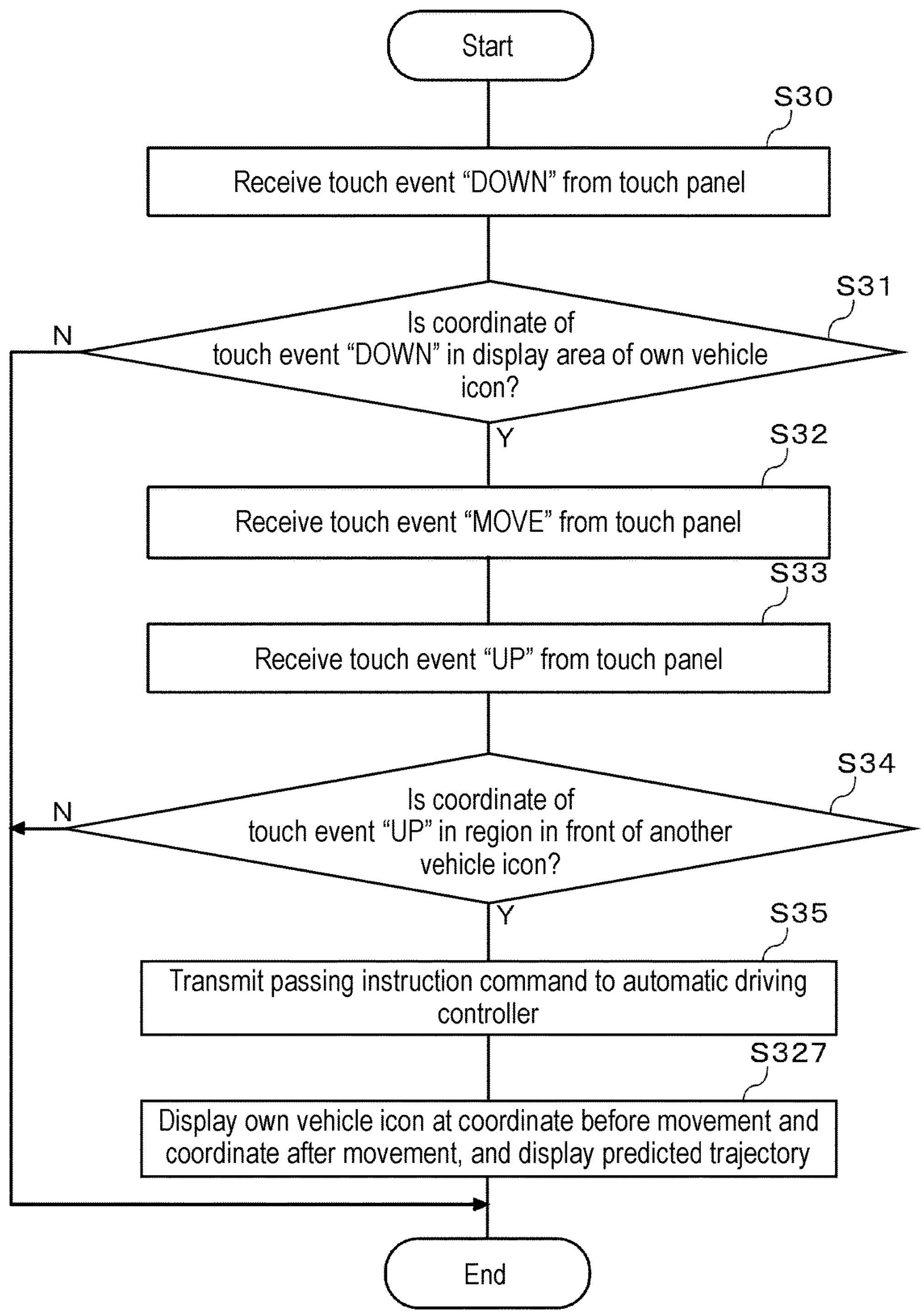
FIG. 22 is a flowchart illustrating a ninth processing example of issuing a passing instruction command by a gesture operation.

FIG. 22 is a flowchart illustrating a ninth processing example of issuing a passing instruction command by a gesture operation. The ninth processing example is an example in a case where display during control is added. During control indicates during a period for which a passing instruction command is issued and then the passing of the own vehicle is completed. Processes from step S30 to step S35 are the same as those of the flowchart of FIG. 6.

After instruction unit 13 issues a passing instruction command to automatic driving controller 20 (S35), generation unit 12 generates the own vehicle icon at the coordinate before the movement of the own vehicle and the coordinate after the movement of the own vehicle, generates a predicted trajectory of the own vehicle, and displays the predicted trajectory of the own vehicle on the touch panel (S327).

Figure 23:
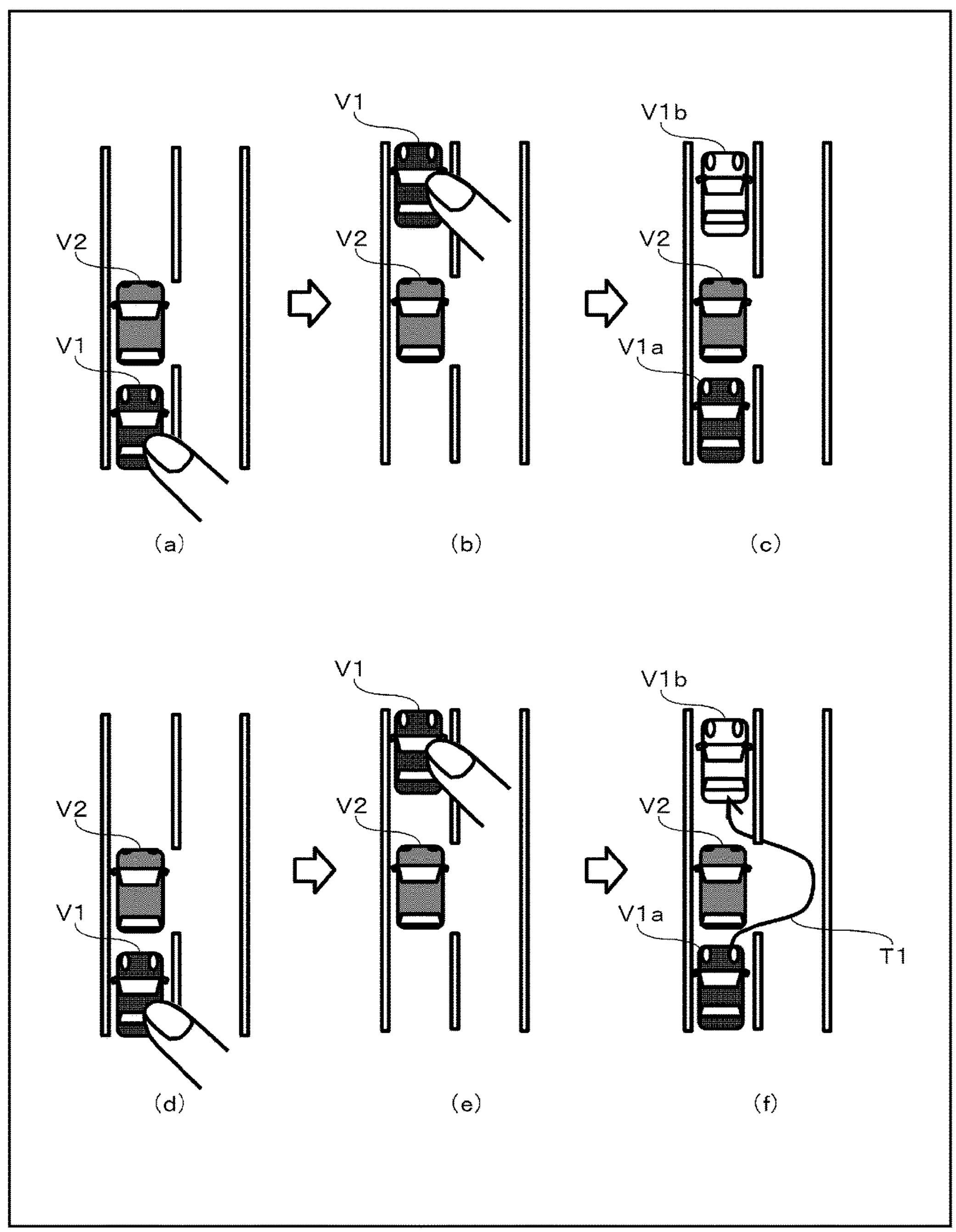
FIG. 23 is a diagram illustrating an example of a gesture operation according to the flowchart of FIG. 22.

FIG. 23 is a diagram illustrating an example of a gesture operation according to the flowchart of FIG. 22. In a case where a driver wants the own vehicle to pass a preceding vehicle, as illustrated in (a) and (d) of FIG. 23, the driver drags the own vehicle icon V1, and as illustrated in (b) and (e) of FIG. 23, drops the own vehicle icon V1 onto a position in front of the another vehicle icon V2. Accordingly, a passing instruction command is issued. During the execution of the passing instruction command, as illustrated in (c) and (f) of FIG. 23, the own vehicle icon Via is displayed at the original position before starting of the passing, and the own vehicle icon V1*b* is displayed at the target position after the completion of the passing. As illustrated in (f) of FIG. 23, a predicted trajectory T1 of the own vehicle may be displayed.

Figure 24:
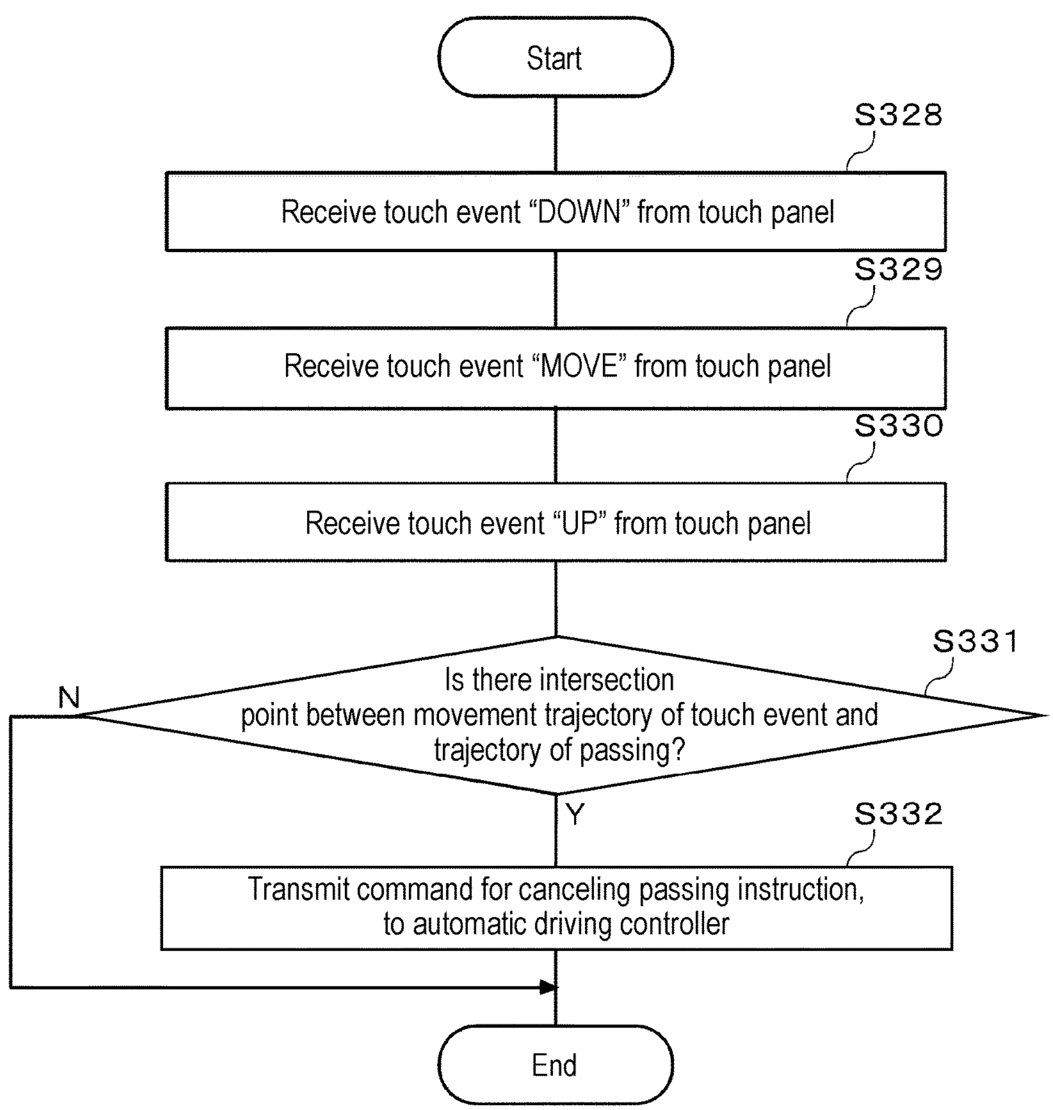
FIG. 24 is a flowchart illustrating a processing example of issuing a cancel command after a passing instruction command is issued by a gesture operation.

FIG. 24 is a flowchart illustrating a processing example of issuing a cancel command after a passing instruction command is issued by a gesture operation. After a passing instruction command is issued to automatic driving controller 20, determination unit 11 of HMI controller 10 receives a touch event "DOWN" from the touch panel (S328). Then, determination unit 11 of HMI controller 10 receives a touch event "MOVE" from the touch panel (S329). Then, determination unit 11 of HMI controller 10 receives a touch event "UP" from the touch panel (S330). Determination unit 11 determines whether or not there is an intersection point between the movement trajectory of the touch event and the trajectory of the passing (S331). In a case where there is an intersection point (Y in S331), instruction unit 13 issues a command for canceling the passing instruction command that is issued earlier, to automatic driving controller 20 (S332). In a case where there is no intersection point (N in S331), a cancel command is not issued.

Figure 25:
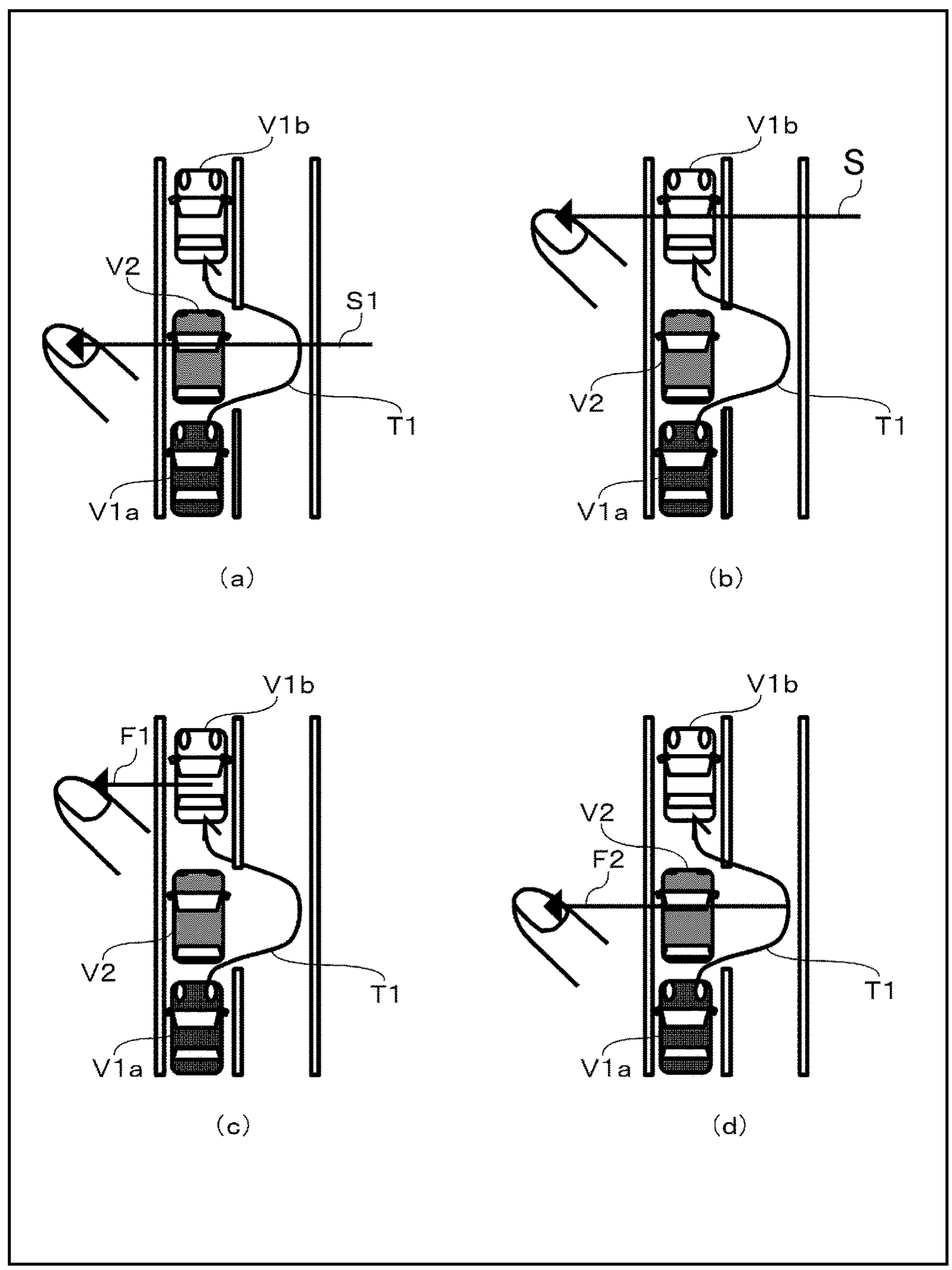
FIG. 25 is a diagram illustrating an example of a gesture operation according to the flowchart of FIG. 24.

FIG. 25 is a diagram illustrating an example of a gesture operation according to the flowchart of FIG. 24. In (a) of FIG. 25, an example in which, when a swipe S1 of the predicted trajectory T1 is performed so as to traverse the predicted trajectory T1, a cancel command for canceling the passing instruction command is issued, is illustrated. In (b) of FIG. 25, an example in which, when a swipe S2 of the own vehicle icon V1*b* after the movement is performed so as to traverse the own vehicle icon V1*b*, a cancel command for canceling the passing instruction command is issued, is illustrated. In (c) of FIG. 25, an example in which, when a flick F1 of the own vehicle icon V1*b* after the movement is performed starting from the own vehicle icon V1*b*, a cancel command for canceling the passing instruction command is issued, is illustrated. In (d) of FIG. 25, an example in which, when a flick F2 of the predicted trajectory T1 is performed starting from the predicted trajectory T1, a cancel command for canceling the passing instruction command is issued, is illustrated.

Figure 26:
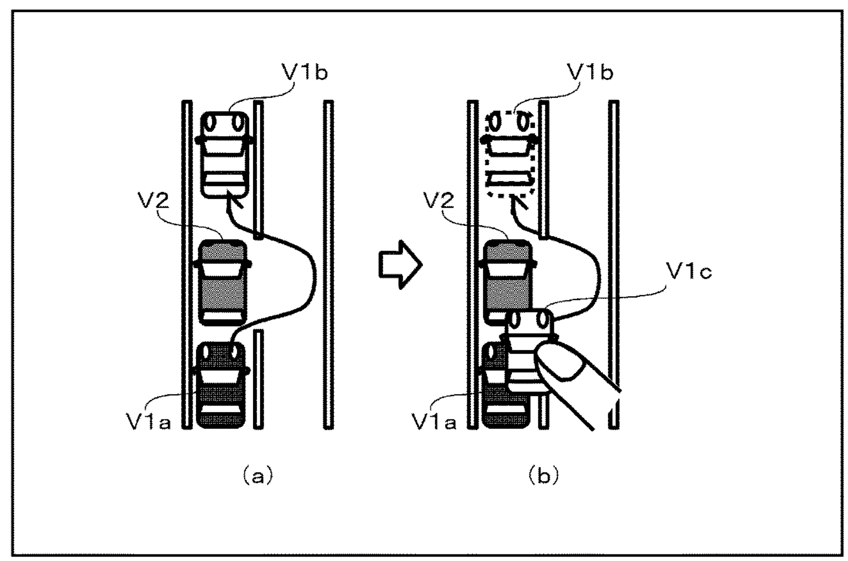
FIG. 26 is a diagram illustrating another example of a gesture operation according to the flowchart of FIG. 24.

FIG. 26 is a diagram illustrating another example of a gesture operation according to the flowchart of FIG. 24. As illustrated in (a) of FIG. 26, when a driver drags the own vehicle icon V1*b* after the movement, and as illustrated in (b) of FIG. 26, drops the own vehicle icon V1*c* onto the position of the own vehicle icon before the movement, a cancel command for canceling the passing instruction command is issued.

During a period for which the own vehicle icon is dragged and dropped, generation unit 12 may hold the original image (own vehicle icon before movement) in the schematic diagram, and delete the original image when the own vehicle icon is dropped. During the period for which the own vehicle icon is dragged and dropped, generation unit 12 may draw a trajectory of the dragged own vehicle icon using a dotted line in the schematic diagram. During the period for which the own vehicle icon is dragged and dropped, generation unit 12 may invert the color of the road, and return the color of the road to the original color thereof when the own vehicle icon is dropped.

During the period for which the own vehicle icon is dragged and dropped, when there is a drop disable area (an opposite traffic lane or the like) or when an operation (passing or the like) is disabled, generation unit 12 may change (invert, thin, or the like) the color of the own vehicle icon. When the own vehicle icon is dropped, the own vehicle icon may return to the original position thereof, and an error message such as "operation disabled" may be displayed. Examples of a case where an operation is disabled includes the approach of a following vehicle, a passing prohibited area, exceeding of a limiting speed, or the like.

During the period for which the own vehicle icon is dragged and dropped, when an operation is disabled, generation unit 12 may change (invert, thin, or the like) a color of a background such as a road or the like. When an operation is enabled, the color of the background is returned to the original color thereof. During the period for which the own vehicle icon is dragged and dropped, generation unit 12 changes (inverts, thins, or the like) a color of the drop disable area. During the period for which the own vehicle icon is dragged and dropped, when there is a drop disable area or when an operation is disabled, generation unit 12 may perform notification using an error sound or a vibration.

When the drag of the own vehicle icon is started, in a case where the start of an operation is disabled, generation unit 12 may change the color of the own vehicle icon. The drag operation (movement of the own vehicle icon) may be disabled. An error message such as "operation disabled" may be displayed. When the drag of the own vehicle icon is started, in a case where the start of an operation is disabled, generation unit 12 may change the color of the background such as a road or the like. When an operation is enabled, the color of the background is returned to the original color thereof. When the drag of the own vehicle icon is started, in a case where the start of an operation is disabled, generation unit 12 performs notification using an error sound or a vibration in a state where the drag operation (movement of the own vehicle icon) is disabled.

Figure 27:
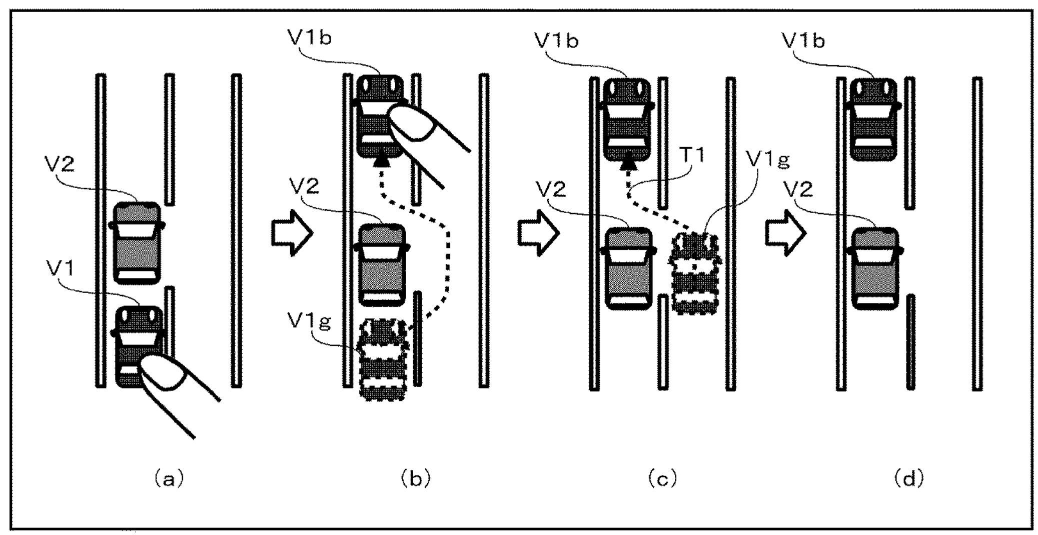
FIG. 27 is a diagram illustrating a first display example of an own vehicle icon being controlled while the own vehicle icon is dropped and the own vehicle completes passing.

FIG. 27 is a diagram illustrating a first display example of an own vehicle icon being controlled while the own vehicle icon is dropped and the own vehicle completes passing. In a case where a driver wants the own vehicle to pass a preceding vehicle, as illustrated in (a) of FIG. 27, the driver drags the own vehicle icon V1, and as illustrated in (b) of FIG. 27, drops the own vehicle icon V1 onto a position in front of the another vehicle icon V2. During a period for which the own vehicle icon V1 is dropped in front of the another vehicle icon V2 and the own vehicle completes passing, as illustrated in (c) of FIG. 27, a state (a current position) of the own vehicle is displayed as a ghost icon V1*g*. A trajectory T1 being moved is also displayed. When passing is completed, as illustrated in (d) of FIG. 27, the ghost icon V1*g* and the trajectory T1 of the own vehicle are deleted.

Figure 28:
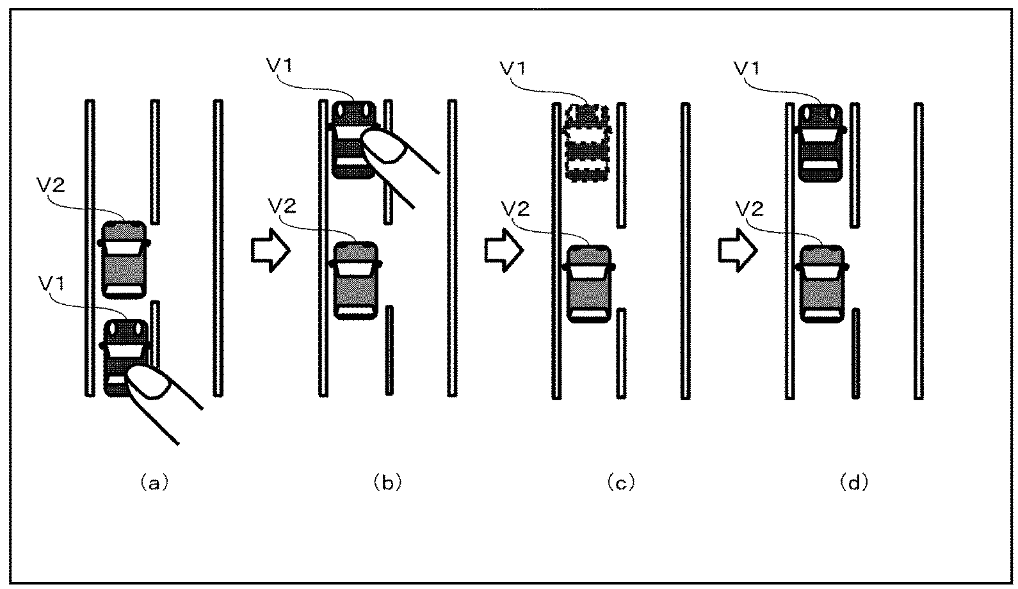
FIG. 28 is a diagram illustrating a second display example of an own vehicle icon being controlled while the own vehicle icon is dropped and the own vehicle completes passing.

FIG. 28 is a diagram illustrating a second display example of an own vehicle icon being controlled while the own vehicle icon is dropped and the own vehicle completes passing. In a case where a driver wants the own vehicle to pass a preceding vehicle, as illustrated in (a) of FIG. 28, the driver drags the own vehicle icon V1, and as illustrated in (b) of FIG. 28, drops the own vehicle icon V1 onto a position in front of the another vehicle icon V2. During the period for which the own vehicle icon V1 is dropped in front of the another vehicle icon V2 and the own vehicle completes passing, as illustrated in (c) of FIG. 28, a display state of the own vehicle icon V1 at the destination of movement is changed. In (c) of FIG. 28, an example in which the own vehicle icon V1 is flashed is illustrated, but a color change, a size change, a position change, or the like may be performed. When passing is completed, as illustrated in (d) of FIG. 28, the display state of the own vehicle icon V1 is returned to the original display state thereof.

Figure 29:
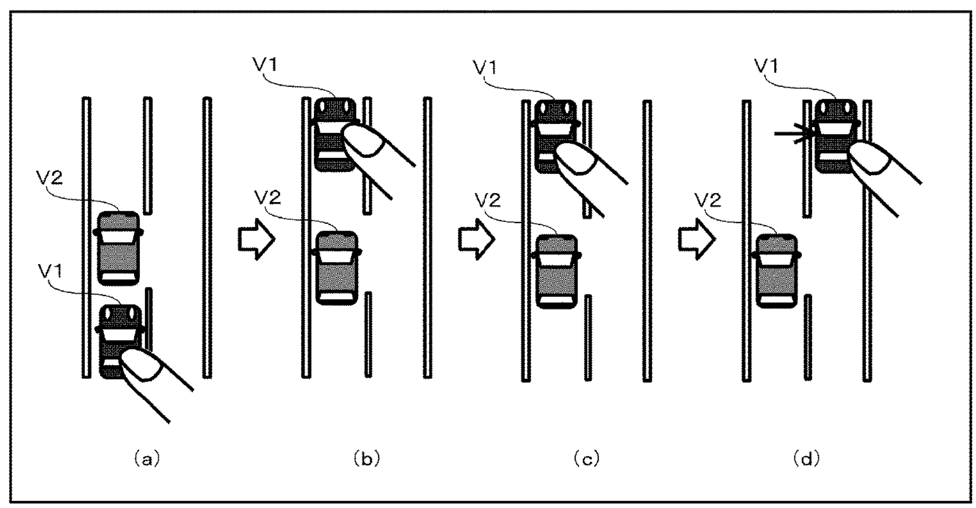
FIG. 29 is a diagram illustrating a third display example of an own vehicle icon being controlled while the own vehicle icon is dropped and the own vehicle completes passing.

FIG. 29 is a diagram illustrating a third display example of an own vehicle icon being controlled while the own vehicle icon is dropped and the own vehicle completes passing. In a case where a driver wants the own vehicle to pass a preceding vehicle, as illustrated in (a) of FIG. 29, the driver drags the own vehicle icon V1, and as illustrated in (b)

of FIG. 29, drops the own vehicle icon V1 onto a position in front of the another vehicle icon V2. During the period for which the own vehicle icon V1 is dropped in front of the another vehicle icon V2 and the own vehicle completes passing, a next instruction is queued as an additional operation (control to be performed after completion of a current control is reserved). In (c) and (d) of FIG. 29, an example in which traffic lane change is additionally instructed during passing control is illustrated. In this case, although passing control is as follows: traffic lane change to a passing lane→passing another vehicle→traffic lane change to the original traffic lane→traffic lane change to a passing lane, the last two control processes are cancelled out, and thus the passing control is as follows: traffic lane change to a passing lane→passing another vehicle.

Figure 30:
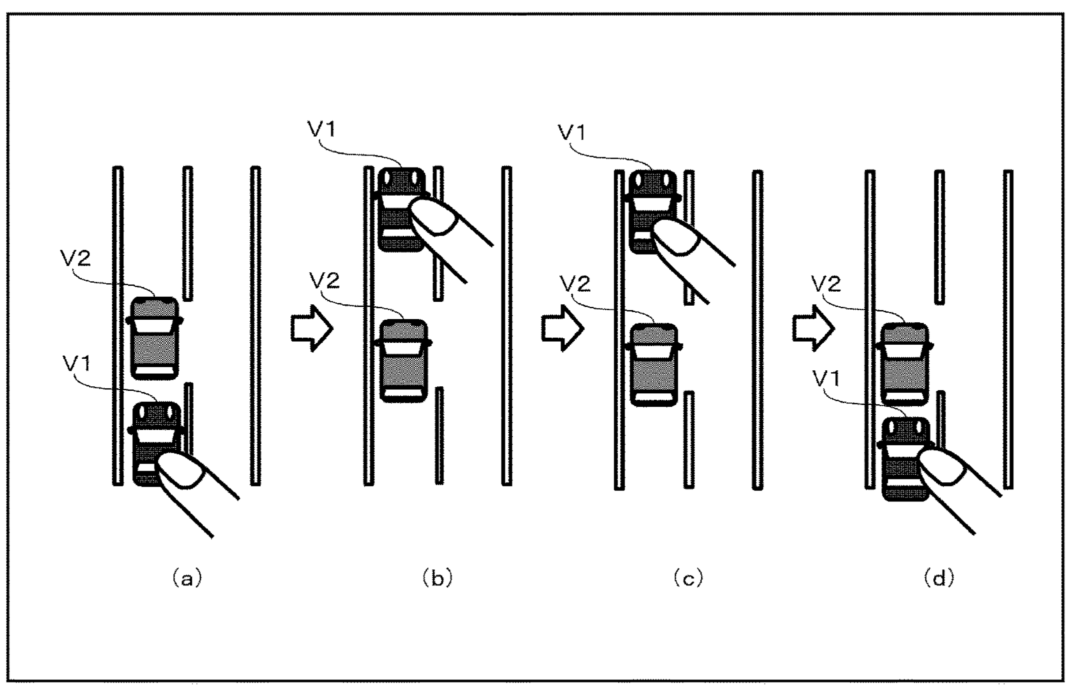
FIG. 30 is a diagram illustrating a fourth display example of an own vehicle icon being controlled while the own vehicle icon is dropped and the own vehicle completes passing.

FIG. 30 is a diagram illustrating a fourth display example of an own vehicle icon being controlled while the own vehicle icon is dropped and the own vehicle completes passing. In a case where a driver wants the own vehicle to pass a preceding vehicle, as illustrated in (a) of FIG. 30, the driver drags the own vehicle icon V1, and as illustrated in (b) of FIG. 30, drops the own vehicle icon V1 onto a position in front of the another vehicle icon V2. During the period for which the own vehicle icon V1 is dropped in front of the another vehicle icon V2 and the own vehicle completes passing, as illustrated in (c) and (d) of FIG. 30, in a case where the own vehicle icon V1 is dragged again and dropped the original position thereof, the following processing is performed. When the own vehicle icon V1 is dropped onto the original position thereof, in a case where traffic lane change to a passing lane is being performed or traffic lane change to a passing lane is completed, a command that instructs traffic lane change to the original traffic lane is transmitted. When the own vehicle icon V1 is dropped onto the original position thereof, in a case where the own vehicle is passing the another vehicle, in a case where the own vehicle passed the another vehicle, or in a case where the own vehicle is in traffic lane change to the original traffic lane, an error message (for example, "Since control is in progress, the operation cannot be performed.", "Please wait for a while.", or the like) is displayed. During dragging of an own vehicle icon, at the time of dropping of an own vehicle icon, or during a period for which an own vehicle icon is dropped and the own vehicle completes passing, a predicted trajectory is received from automatic driving controller 20, and the predicted trajectory may be drawn on display unit 31. In a case where passing is disabled temporarily because the own vehicle is waiting for the light to change or in a traffic lane change disable section, generation unit 12 performs a display such as "trying" until passing control is established, and may draw a predicted trajectory at a timing at which processing becomes executable. During dragging of an own vehicle icon, or during the period for which an own vehicle icon is dropped and the own vehicle completes passing, generation unit 12 may display an estimated required-time or a remaining required-time until the own vehicle icon is dropped and the own vehicle reaches the destination position. In a case where passing control is disabled temporarily, the control may be set in advance to be continued until the control is enabled or suspended and stopped. Since dragging is started accidentally or a cancel operation after dragging is required in some cases, a cancel drop region may be provided. After dragging of an own vehicle icon, when a driver drops the own vehicle icon onto a cancel drop region, issuing of a command can be cancelled. After passing control, in a case where there is further another vehicle in front of the own vehicle, a mode for controlling repetition of passing may be provided.

As described above, according to the present embodiment, it is possible to transfer the contents of various operations to automatic driving controller 20 by moving an icon displayed on the touch panel by a gesture operation. The gesture operation of the icon is a simple operation, and thus a driver is released from a driving operation in the related art such as turning of steering 51, depressing of accelerator pedal 53, or the like. For example, it is possible to easily instruct passing by displaying a schematic diagram including a lane, an own vehicle icon, and an another vehicle icon and changing the positional relationship between the own vehicle icon and the another vehicle icon. A driver can perform a confirmation of a peripheral situation and an operation instruction on the touch panel at the same time, and thus the sight line of the driver does not move. Accordingly, it is possible to reduce the possibility of an erroneous operation and realize safer driving. In order to issue a command for instructing passing or overtaking, other than the above operation, an operation for changing the relative positions of the own vehicle icon and the another vehicle may be used. Although a gesture operation corresponding to a control command is described as a drag-and-drop operation or the like, a touch-and-touch operation may be used. A predetermined gesture or operation is preferably used, but an operation that is customizable by a driver may be used. Further, in order to recognize the corresponding relationship of a gesture operation and a control command, a comment, an icon, or an arrow may be displayed by display unit, or a guide display or voice guidance may be provided by display unit.

As above, the present disclosure has been described based on the embodiments. These embodiments have been presented by way of example only, and it should be understood by those skilled in the art that the embodiments can be modified in various forms by combining the respective elements or processing processes, and the modification examples are included in the scope of the present disclosure.

For example, although an example in which HMI controller 10 is implemented by a dedicated LSI is assumed, functions of HMI controller 10 may be realized using a central processing unit (CPU) in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

The embodiments may be specified by the following items.

[Item 1]

A driving support device (10) includes: an image output unit (14*a*) that outputs, to a display unit (31), an image containing an own vehicle object representing an own vehicle and an another vehicle object representing another vehicle in front of the own vehicle object; an operation signal input unit (14*b*) that receives an operation of a user for changing the positional relationship between the own vehicle object and the another vehicle object in the image displayed on the display unit (31); and a command output unit (14*c*) that outputs, to an automatic driving control unit (20) that controls automatic driving, a command for instructing the own vehicle to pass the another vehicle when the positional relationship between the own vehicle object and the another vehicle object is changed such that the own vehicle object is positioned in front of the another vehicle object.

In this case, a user can intuitively and conveniently perform an operation for instructing passing.

[Item 2]

In the driving support device (10) of Item 1, when the operation signal input unit (14*b*) receives an operation of the user that is described as follows, the command output unit (14*c*) outputs, to the automatic driving control unit (20), a command for instructing the own vehicle to pass the another vehicle. The operation of the user is an operation of the user for moving the own vehicle object in the image displayed on the display unit (31) to a position in front of the another vehicle object, an operation of the user for moving the another vehicle object to a position behind the own vehicle object, or an operation of the user for interchanging the own vehicle object and the another vehicle object.

In this case, a user can intuitively and conveniently perform an operation for instructing passing.

[Item 3]

In the driving support device (10) of Item 1, the image output unit (14*a*) outputs an image containing the own vehicle object and a plurality of other vehicle objects representing a plurality of other vehicles in front of the own vehicle object. When the operation signal input unit (14*b*) receives an operation of the user for changing the positional relationships between the own vehicle object and the plurality of other vehicle objects in the image displayed on the display unit (31) such that the own vehicle object is positioned in front of the plurality of other vehicle objects, the command output unit (14*c*) outputs, to the automatic driving control unit (20), a command for instructing the own vehicle to pass the plurality of other vehicles.

In this case, it is possible to intuitively and conveniently perform an operation for instructing the own vehicle to pass the plurality of other vehicles at a time.

[Item 4]

A driving support system (10, 30) according to Item 4 includes: a display device (30) that displays an image; and a driving support device (10) that outputs an image to the display device (30). The driving support device (10) includes: an image output unit (14*a*) that outputs, to the display device (30), an image containing an own vehicle object representing an own vehicle and an another vehicle object representing another vehicle in front of the own vehicle object; an operation signal input unit (14*b*) that receives an operation of a user for changing the positional relationship between the own vehicle object and the another vehicle object in the image displayed on the display device (30); and a command output unit (14*c*) that outputs, to an automatic driving control unit (20) that controls automatic driving, a command for instructing the own vehicle to pass the another vehicle when the positional relationship between the own vehicle object and the another vehicle object is changed such that the own vehicle object is positioned in front of the another vehicle object.

In this case, a user can intuitively and conveniently perform an operation for instructing passing.

[Item 5]

A driving support method of Item 5 includes: a step of outputting, to a display unit (31), an image containing an own vehicle object representing an own vehicle and an another vehicle object representing another vehicle in front of the own vehicle object; a step of receiving an operation of a user for changing the positional relationship between the own vehicle object and the another vehicle object in the image displayed on the display unit (31); and a step of outputting, to an automatic driving control unit (20) that controls automatic driving, a command for instructing the own vehicle to pass the another vehicle when the positional relationship between the own vehicle object and the another vehicle object is changed such that the own vehicle object is positioned in front of the another vehicle object.

In this case, a user can intuitively and conveniently perform an operation for instructing passing.

[Item 6]

A driving support program of Item 6 that causes a computer to execute: processing to output, to a display unit (31), an image containing an own vehicle object representing an own vehicle and an another vehicle object representing another vehicle in front of the own vehicle object; processing to receive an operation of a user for changing the positional relationship between the own vehicle object and the another vehicle object in the image displayed on the display unit (31); and processing to output, to an automatic driving control unit (20) that controls automatic driving, a command for instructing the own vehicle to pass the another vehicle when the positional relationship between the own vehicle object and the another vehicle object is changed such that the own vehicle object is positioned in front of the another vehicle object.

In this case, a user can intuitively and conveniently perform an operation for instructing passing.

[Item 7]

An automatic drive vehicle (1) of Item 7 includes: an image output unit (14*a*) that outputs, to a display unit (31), an image containing an own vehicle object representing an own vehicle and an another vehicle object representing another vehicle in front of the own vehicle object; an operation signal input unit (14*b*) that receives an operation of a user for changing the positional relationship between the own vehicle object and the another vehicle object in the image displayed on the display unit (31); a command output unit (14*c*) that outputs a command for instructing the own vehicle to pass the another vehicle when the positional relationship between the own vehicle object and the another vehicle object is changed such that the own vehicle object is positioned in front of the another vehicle object; and an automatic driving control unit (20) that executes the output command In this case, a user can intuitively and conveniently perform an operation for instructing passing.

The present disclosure can be used in a vehicle equipped with automatic driving mode.

The invention claimed is:

1. A driving support device comprising:

a controller, which, in operation:

outputs, to a display unit, an image containing a vehicle object representing a vehicle and an another vehicle object representing another vehicle in front of the vehicle object;

receives an operation of a user changing, in the image displayed on the display unit, a positional relationship between the vehicle object and the another vehicle object; and outputs, to an automatic driving control unit that controls automatic driving, a command for instructing the vehicle to pass the another vehicle, when the operation of the user received by the controller changes the positional relationship between the vehicle object and the another vehicle object such that the vehicle object is positioned in front of the another vehicle object.

2. The driving support device of claim 1, wherein when the operation of the user received by the controller moves, in the image displayed on the display unit, the vehicle object to a position in front of the another vehicle object, moves, in the image displayed on the display unit, the another vehicle object to a position behind the vehicle object, or interchanges, in the image displayed on the display unit, the vehicle object and the another vehicle object, the controller outputs, to the automatic driving control unit, a command for instructing the vehicle to pass the another vehicle.

3. The driving support device of claim 1, wherein the controller outputs an image containing the vehicle object and a plurality of other vehicle objects representing a plurality of other vehicles in front of the vehicle object, and when the controller receives an operation of the user changing, in the image displayed on the display unit, positional relationships between the vehicle object and the plurality of other vehicle objects, the controller outputs, to the automatic driving control unit, a command for instructing the vehicle to pass the plurality of other vehicles.

4. A driving support method comprising:

outputting, to a display unit, an image containing a vehicle object representing a vehicle and an another vehicle object representing another vehicle in front of the vehicle object;

receiving an operation of a user changing, in the image displayed on the display unit, a positional relationship between the vehicle object and the another vehicle object; and outputting, to an automatic driving control unit that controls automatic driving, a command for instructing the vehicle to pass the another vehicle when the positional relationship between the vehicle object and the another vehicle object is changed by the operation of the user such that the vehicle object is positioned in front of the another vehicle object.

5. A driving support system comprising:

a display device which, in operation, displays an image; and a driving support device which, in operation outputs the image to the display device, wherein the driving support device includes: a controller, which, in operation:

outputs, to the display device, an image containing a vehicle object representing a vehicle and an another vehicle object representing another vehicle in front of the vehicle object;

receives an operation of a user changing, in the image displayed on the display device, a positional relationship between the vehicle object and the another vehicle object; and outputs, to an automatic driving control unit that controls automatic driving, a command for instructing the vehicle to pass the another vehicle, when the operation of the user received by the controller changes the positional relationship between the vehicle object and the another vehicle object such that the vehicle object is positioned in front of the another vehicle object.

* * * * *